United States Patent
Murasawa et al.

(10) Patent No.: US 10,686,952 B2
(45) Date of Patent: Jun. 16, 2020

(54) IMAGE PROCESSING APPARATUS, IMAGE PROCESSING METHOD, AND DISPLAY APPARATUS WITH GENERATION OF PREVIEW IMAGE DATA FOR PREVIEW IMAGE OF COLOR METALLIC IMAGE

(71) Applicant: CANON KABUSHIKI KAISHA, Tokyo (JP)

(72) Inventors: Kouta Murasawa, Yokohama (JP); Yugo Mochizuki, Kawasaki (JP); Masao Kato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/193,418

(22) Filed: Nov. 16, 2018

(65) Prior Publication Data
US 2019/0158688 A1   May 23, 2019

(30) Foreign Application Priority Data

Nov. 22, 2017   (JP) ................ 2017-224736
Oct. 30, 2018   (JP) ................ 2018-203993

(51) Int. Cl.
*H04N 1/00* (2006.01)
(52) U.S. Cl.
CPC .............. *H04N 1/00442* (2013.01)
(58) Field of Classification Search
None
See application file for complete search history.

(56) References Cited

U.S. PATENT DOCUMENTS

| | | | |
|---|---|---|---|
| 7,924,469 B2 | 4/2011 | Ono et al. |
| 7,944,588 B2 | 5/2011 | Yamada et al. |
| 8,175,155 B2 | 5/2012 | Suwa et al. |
| 8,237,991 B2 | 8/2012 | Ono et al. |
| 8,705,889 B2 | 4/2014 | Murasawa |
| 9,135,523 B2 | 9/2015 | Kato et al. |

(Continued)

FOREIGN PATENT DOCUMENTS

JP    5757759 B2    7/2015

OTHER PUBLICATIONS

B.E. Bayer, An Optimum Method for Two-Level Rendition of Continuous-Tone Pictures, Institute of Electrical and Electronics Engineers, Inc., Jun. 11-13, 1973, pp. 11-15, CAT. No. 73 CHO 744-3-CSCB, Seattle, Washington.

*Primary Examiner* — Andrew H Lam
(74) *Attorney, Agent, or Firm* — Venable LLP

(57) ABSTRACT

Provided are an image processing apparatus, image processing method, and display apparatus capable of processing a printed image including a color metallic area to be printed by applying color ink containing coloring material and metallic ink containing metal particles on top of each other, into an image displayable on the display apparatus. The image processing apparatus includes: a generation unit that generates preview image data for displaying a preview image on a display apparatus, based on image data for printing a color metallic image including the color metallic area; and a control unit that controls the display apparatus such that the preview image is displayed based on the preview image data generated by the generation unit. A color that expresses the color metallic area in the preview image data is different from a color forming the color metallic area in the image data.

25 Claims, 15 Drawing Sheets

(56) References Cited

U.S. PATENT DOCUMENTS

| | | |
|---|---|---|
| 9,232,109 B2 | 1/2016 | Suwa et al. |
| 9,704,221 B2 | 7/2017 | Hori et al. |
| 2009/0244118 A1* | 10/2009 | Kakutani ............... B41J 2/2107 347/6 |
| 2012/0268759 A1 | 10/2012 | Ono et al. |
| 2015/0062602 A1* | 3/2015 | Ono .................... H04N 1/3871 358/1.9 |
| 2017/0039746 A1 | 2/2017 | Mizoguchi et al. |

* cited by examiner

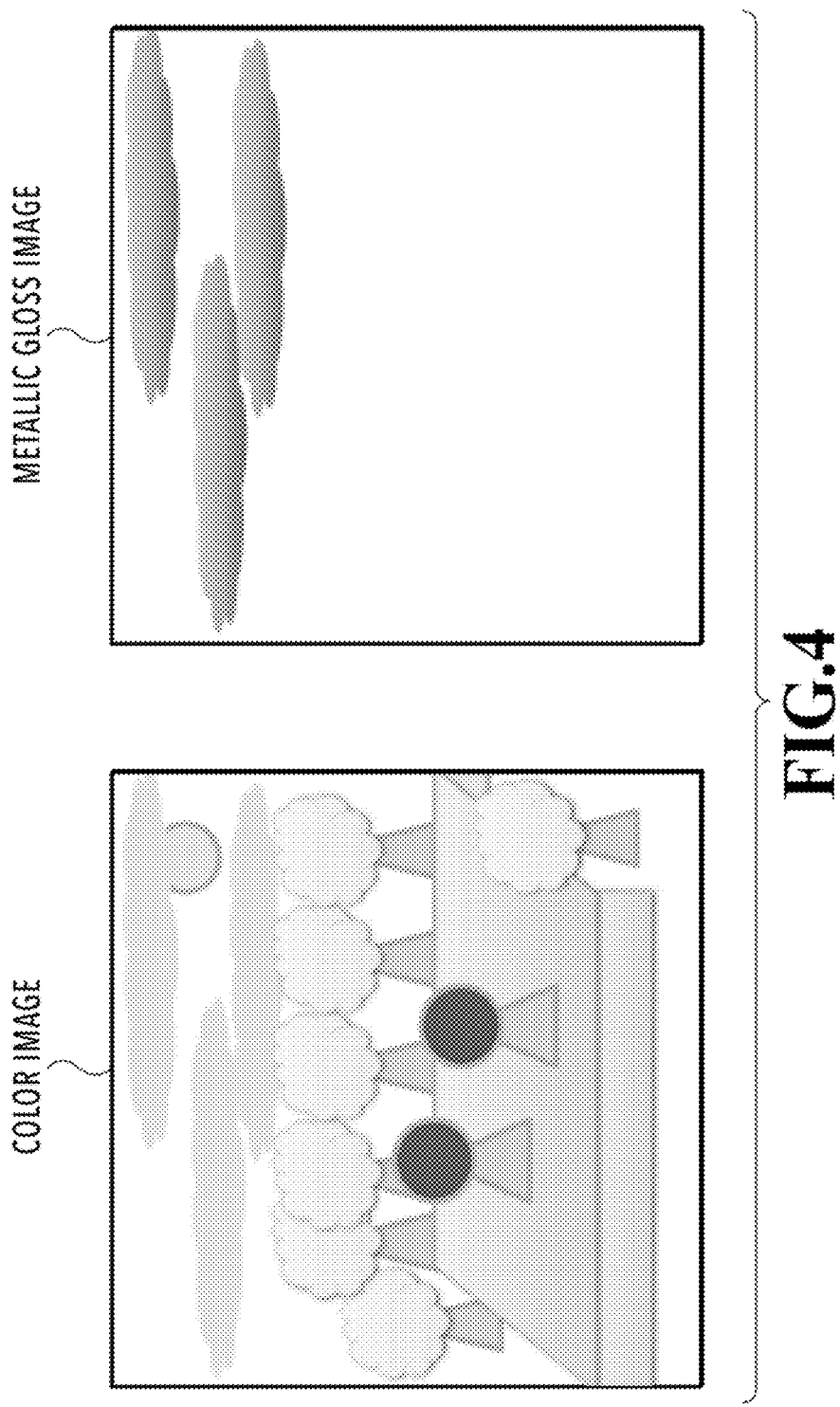

IMAGE PROCESSING APPARATUS, IMAGE PROCESSING METHOD, AND DISPLAY APPARATUS WITH GENERATION OF PREVIEW IMAGE DATA FOR PREVIEW IMAGE OF COLOR METALLIC IMAGE

BACKGROUND OF THE INVENTION

Field of the Invention

The present invention relates to an image processing apparatus and image processing method for processing printed images so that the printed image can be displayed on a display apparatus, and also relates to a display apparatus including the image processing apparatus.

Description of the Related Art

There is known metallic ink that includes metal particles and that is ejected on a print medium with an inkjet printing apparatus or the like, thereby forming a printed matter on the print medium without a special process such as baking. Japanese Patent No. 5757759 discloses a metallic ink including ultrafine aluminum particles suitable to give metallic appearance (metallic gloss) or conductivity to a printed matter.

When printing with a metallic ink and inks (color inks) such as process color inks which produce colors by absorption and reflection of visible light, an area to be printed with the metallic ink needs to be checked in terms of the functional quantity (for example, the degree of metallic gloss) and the position. Such check work is done by using a check method in which a printed image is displayed as a preview on a display apparatus before printing.

Unfortunately, for typical display apparatuses, it is difficult in principle to express metallic gloss. For this reason, it is necessary to check a printed matter actually printed on a print medium. Doing such check work needs printing materials such as print mediums and inks, which has been a burden on the user.

SUMMARY OF THE INVENTION

The present invention has been made in light of the above problem and provides an image processing apparatus, image processing method, and display apparatus capable of, in order to print an image including a color metallic area to be formed by applying color ink containing coloring material and metallic ink containing metal particles on top of each other, displaying the image as a preview on the display apparatus.

In a first aspect of the present invention, there is provided an image processing apparatus comprising: a generation unit that generates preview image data for displaying a preview image on a display apparatus, based on image data for printing a color metallic image including a color metallic area to be formed by applying metallic ink containing metal particles and color ink containing coloring material on top of each other; and a control unit that controls the display apparatus to cause the display apparatus to display the preview image, based on the preview image data generated by the generation unit, wherein a color that expresses the color metallic area in the preview image data is different from a color forming the color metallic area in the image data.

In a second aspect of the present invention, there is provided an image processing method comprising: a generation step of generating preview image data for displaying a preview image on a display apparatus, based on image data for printing a color metallic image including a color metallic area to be formed by applying metallic ink containing metal particles and color ink containing coloring material on top of each other; and a display step of displaying the preview image on the display apparatus, based on the preview image data generated in the generation step, wherein a color that expresses the color metallic area in the preview image data is different from a color forming the color metallic area in the image data.

In a third aspect of the present invention, there is provided a display apparatus comprising: an image processing apparatus that generates preview image data for displaying a preview image on a display unit, based on image data for printing a color metallic image including a color metallic area to be formed by applying metallic ink containing metal particles and color ink containing coloring material on top of each other; and a display unit that displays the preview image, based on the preview image data generated by the image processing apparatus, wherein a color that expresses the color metallic area in the preview image data is different from a color forming the color metallic area in the image data.

With the present invention, when an image including a color metallic area to be formed by applying metallic ink containing metal particles and color ink containing coloring material on top of each other is displayed as a preview on a display apparatus, the user can easily distinguish the color metallic area.

Further features of the present invention will become apparent from the following description of exemplary embodiments with reference to the attached drawings.

BRIEF DESCRIPTION OF THE DRAWINGS

FIG. 4 is an explanatory diagram illustrating a color image and a metallic gloss image;

DESCRIPTION OF THE EMBODIMENTS

Hereinafter, examples of an image processing apparatus, image processing method, and display apparatus according to the present invention will be described in detail with reference to the attached drawings. Note that constituents described in the following embodiments are mere examples and are not intended to limit the scope of the present invention only to those described.

First Embodiment

Figure 1:
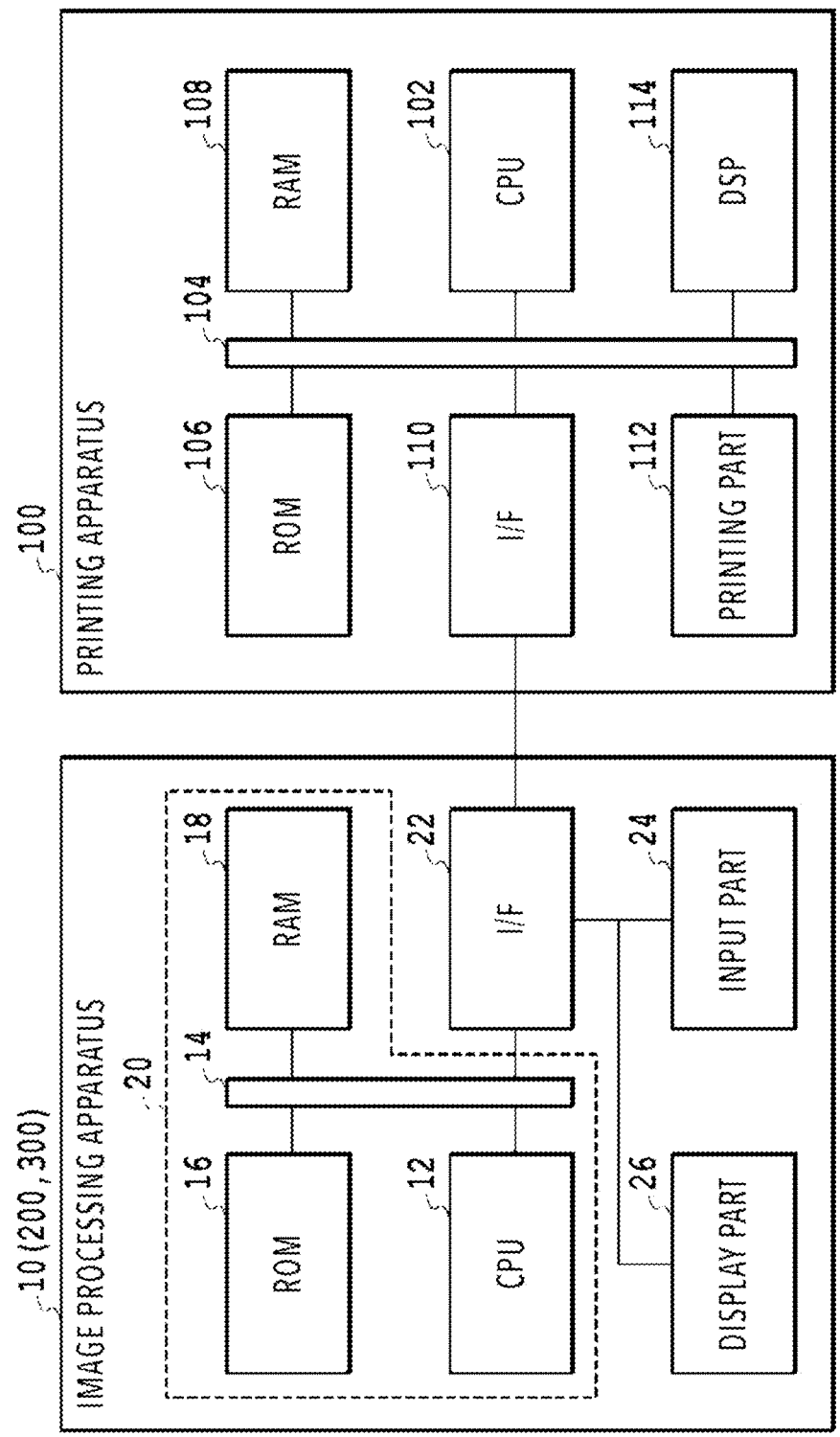
FIG. 1 is a schematic configuration diagram of an image processing apparatus and a printing apparatus according to the present invention.
Figure 2:
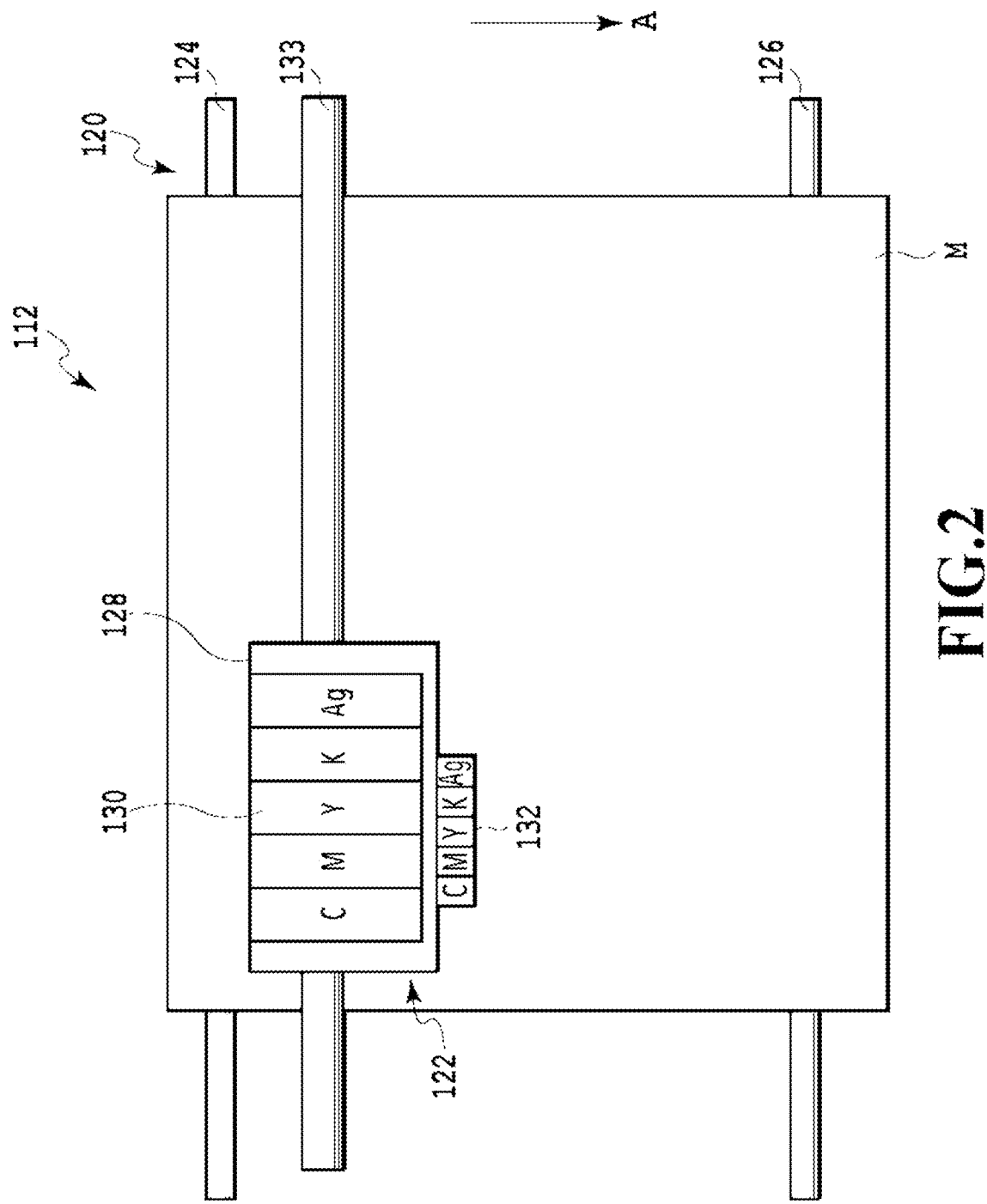
FIG. 2 is a schematic configuration diagram of a printing part.

First, a first embodiment of an image processing apparatus according to the present invention will be described with reference to FIGS. 1 to 9. FIG. 1 is the block diagram of the image processing apparatus and printing apparatus according to the present invention. FIG. 2 is a schematic configuration diagram of a printing part of the printing apparatus.

For the image processing apparatus 10, a general purpose personal computer, mobile phone, smartphone, tablet PC, digital camera, or a portable terminal or stationary terminal of other types is used. The image processing apparatus 10 includes a central processing unit (CPU) 12 for perform various processes. The CPU 12 is connected via a bus 14 to a ROM 16 storing a program for the CPU 12 executing various processes and a RAM 18 as a working area for setting various registers necessary when the CPU 12 executes the program. These CPU 12, ROM 16 and RAM 18 make up a control part 20, which executes various processes on printed images as print data.

The CPU 12 is also connected via the bus 14 to an interface (I/F) 22 which can be connected to external apparatuses in a wired or wireless manner. The image processing apparatus 10 is connected to a printing apparatus 100 via the I/F 22. Also connected to the I/F 22 are an input part 24 for the user inputting instructions to the image processing apparatus 10 and a display part 26 (display unit) for presenting specified information to the user.

Here, description will be provided for a case where a smartphone (image processing apparatus 10) transmits a print job to the printing apparatus 100, as an example of communication between the image processing apparatus 10 and the printing apparatus 100. When the user has a document that he/she wants to print among the documents displayed on the display screen of the smartphone, the user calls a print instruction provided by the operating system (OS) of the smartphone via the input terminal. For a smartphone widely available, the terminal vendor and the printing apparatus vendor collaborate and provide an integrated print protocol on the OS. When the user inputs a print instruction, the OS converts the document for printing into the one in a specified image format and makes a print job according to the print protocol. Specifically, the OS converts the document data for printing into a bitmap image, and then compresses it into a JPEG image. Then, the OS makes a print job file in the XML document format including the compressed image and transmits it to the printing apparatus 100 registered in advance via a wireless LAN.

The printing apparatus 100 includes a CPU 102 for executing various programs. The CPU 102 is connected via a bus 104 to a ROM 106 storing a program and a table to perform a printing process and a RAM 108 as a working area for setting various registers necessary when executing the program. The printing apparatus 100 is also connected via the bus 104 to an interface (I/F) 110 for connecting the printing apparatus 100 to external apparatuses in a wired or wireless manner. Also connected to the printing apparatus 100 via the bus 104 are a printing part 112 for printing and a digital signal processor (DSP) 114 as a hardware apparatus for performing high-load processing such as image processing. The one or multiple parts described above excluding the printing part 112 may be implemented as a single LSI and be made as a component as an ASIC. The printing apparatus 100 is connected to the image processing apparatus 10 via the I/F 110.

As illustrated in FIG. 2, the printing part 112 includes a conveyance part 120 for conveying print mediums M and a head part 122 for ejecting ink to the print mediums M being conveyed in the conveyance part 120. The conveyance part 120 includes two shafts 124 and 126 extending in a specified direction with a specified distance in between. To the shafts 124 and 126 are pressed, for example, driven rollers (not illustrated) and other parts. A motor (not illustrated) or the like rotates the shafts 124 and 126 and conveys a print medium M in the direction of arrow A with the print medium M nipped between the shafts 124 and 126 and the driven rollers.

The head part 122 includes a carriage 128 capable of moving in a direction intersecting (orthogonal to, in this embodiment) the conveyance direction of the print medium M, an ink cartridge 130 detachably mounted, and a print head 132 that ejects ink stored in the ink cartridge 130. The carriage 128 is movably disposed on a guide rail 133 extending in the direction intersecting (orthogonal to, in this embodiment) the direction of arrow A. The print head 132 is disposed on a surface of the carriage 128, facing the print medium M. With this structure, the print head 132 faces the print medium M being conveyed.

In the ink cartridge 130, four color inks including coloring materials and one metallic ink are separately stored. The color inks are cyan (C) ink, magenta (M) ink, yellow (Y) ink, and black (K) ink. The metallic ink is silver (Ag) ink. Note that the inks stored in the ink cartridge 130 are not limited to the above five inks.

The ink cartridge 130 is connected to nozzles (not illustrated) of the print head 132 via flow paths (not illustrated) in the carriage 128. The print head 132 is connected to the bus 104 of the printing apparatus 100 via the communication cable and performs ejection control at specified timings based on inputted printed image information and ejection control information. The print head 132 has a heater (not illustrated) disposed at the nozzles as an ejection-energy generation element and ejects ink by heating the heater. Specifically, heat generated by the heater quickly heats ink inside the nozzles and causes film boiling, generating bubbles, and these bubbles eject ink droplets. Note that for the ejection-energy generation element, a piezo element may be used.

The print head 132, for example, has a nozzle array made up of 512 nozzles aligned in the conveyance direction at intervals of 600 dpi for each ink. The nozzle arrays of the inks are arranged in parallel in the moving direction of the carriage 128. Ejection control of each nozzle can be performed separately from each other. This allows each nozzle to eject ink, for example, to a height of 0.85 inches (the distance between the print medium M being conveyed and the print head 132).

When the image processing apparatus 10 inputs a print job to the printing apparatus 100 with the configuration above, the printing apparatus 100 processes the printed image and then starts print operation. Here, the print job includes print data and print instructions. The print data is image data for creating a printed image and is color image data described later (hereinafter, simply referred to as a "color image") and metallic gloss image data (hereinafter, simply referred to as a "metallic gloss image"). The print instructions include the paper type, paper size, print quality, print size, and layout information such as 2 in 1.

When a print job is inputted to the printing apparatus 100, the print data is, first, converted into ink color density data (CMYKAg) installed in the printing apparatus 100 (color separation). For the conversion method, a known method can be used, such as matrix calculation processing or processing using a four-dimensional lookup table (LUT). Since the printing apparatus 100 uses K ink, C ink, M ink, Y ink, and Ag ink, the print data is subjected to a color space conversion into an image composed of the color signals of CMYKAg. Here, the number of inks is five, K ink, C ink, M ink, Y ink, and Ag ink. However, to improve image quality, light cyan (Lc) ink, light magenta (Lm) ink, gray (Gy) ink, and other colors may be added.

Next, the ink color density data (CMYKAg) is quantized. For the quantization method, a known method can be used. This embodiment uses dither. One of published methods is B.E. Bayer (An Optimum Method for Two-Level Rendition of Continuous Tone Pictures, ICC Conf. (1973)). After that, the printing part 112 performs printing on the print medium M based on the quantized data and the print instructions.

The metallic ink is an ink containing metal particles. The metallic ink in this embodiment is a silver ink containing silver particles as metal particles. Metallic ink exhibits various functions under different print controls. Specifically, examples of the various functions include metallic decorative printing having metallic gloss, circuit printing having conductivity, and mirror printing having high reflectance. Note that in the following description, functions that ink containing metal particles exhibits are referred to as "metallic function" as appropriate.

The content of metal particles in metallic ink (% by mass) with respect to the total mass of the ink is preferably 0.1% by mass or more and 30.0% by mass or less, and more preferably 1.0% by mass or more and 15.0% by mass or less. The kind of metal particles is not limited to any specific metal. Examples of metal particles include gold, silver, copper, platinum, aluminum, titanium, chromium, iron, nickel, zinc, zirconium, and tin. The metal particles may be made of a single-element metal or an alloy. These may be used in combination. From the viewpoints of storage stability, and the conductivities and metallic gloss of the formed image (printed matter), the metal particles are preferably gold, silver, or copper particles, and most preferably silver particles.

Since silver particles have a high metallic gloss property and an achromatic property for formed images, combination with color inks enables expression of a wide variety of metallic colors. From the viewpoints of storage stability of ink, and the conductivities and metallic gloss of an image formed with metal particles, the average particle diameter of silver particles is preferably 1 nm or more and 200 nm or less, and more preferably 10 nm or more and 100 nm or less. Note that for a specific method of measuring the average particle diameter, the average particle diameter can be measured with a measurement apparatus using a dynamic light scattering method, such as the cumulant analysis using scattering of laser light.

The method of dispersing metal particles in metallic ink is not limited to specific ones. For example, resin dispersed metal particles dispersed using dispersing resin, metal particles dispersed using surfactant, and the like can be used. Note that metal particles dispersed in different methods can be combined. For dispersing resin, water-soluble or water-dispersible resins can be used, and the weight average molecular weight of those resins is preferably 1,000 or more and 100,000 or less, and more preferably 3,000 or more and 50,000 or less.

For example, the following can be used as dispersing resin: styrene, vinyl naphthalene, aliphatic alcohol ester of α, β-ethylenically unsaturated carboxylic acid, acrylic acid, maleic acid, itaconic acid, fumaric acid, vinyl acetate, vinyl pyrrolidone, acrylamide, or polymers using derivatives of these materials as monomers. Note that it is preferable that one or more of the monomers included in a polymer be hydrophilic monomers, and a block copolymer, a random copolymer, a graft copolymer, or salts of these materials may be used. Alternatively, natural resins such as rosin, shellac, or starch can also be used. It is preferable that these resins be soluble in aqueous solution in which bases are dissolved, in other words, be alkali-soluble.

For the surfactant, surfactants such as an anionic surfactant, nonionic surfactants, and amphoteric surfactant can be used. Specifically, usable surfactants include polyoxyethylene alkyl ether, polyoxyethylene alkylphenols, acetylene glycol compounds, and acetylene glycol ethylene oxide adducts. In addition, to adjust the surface tension of the ink, the above surfactants may be further added.

It is preferable that an aqueous medium containing water and a water-soluble organic solvent be used for metallic ink. The content of the water-soluble organic solvent in the ink (% by mass) with respect to the total mass of the ink is preferably 3.0% by mass or more and 50.0% by mass or less. The content of the water in the ink (% by mass) with respect to the total mass of the ink is preferably 50.0% by mass or more and 95.0% by mass or less. Note that it is preferable that deionized water (ion-exchanged water) is used for the water.

For the water-soluble organic solvent, for example, the following can be used: alkyl alcohols, such as methanol, ethanol, propanol, propanediol, butanol, butanediol, pentanol, pentanediol, hexanol, and hexanediol; amides, such as dimethylformamide and dimethylacetamide; ketones or keto alcohols, such as acetone and diacetone alcohol; polyalkylene glycols having average molecular weights of, for example, 200, 300, 400, 600, and 1000, including ethers such as tetrahydrofuran and dioxane, polyethylene glycol, and polypropylene glycol; alkylene glycols having an alkylene group having 2 to 6 carbon atoms, such as ethylene glycol, propylene glycol, butylene glycol, triethylene glycol, 1,2,6-hexanetriol, thiodiglycol, hexylene glycol, and diethylene glycol; lower alkyl ether acetates, such as polyethylene glycol monomethyl ether acetate; glycerin; lower alkyl ethers of polyhydric alcohols, such as ethylene glycol monomethyl (or ethyl) ether, diethylene glycol methyl (or ethyl) ether, and triethylene glycol monomethyl (or ethyl) ether.

The metallic ink may contain various additives, such as a pH adjusting agent, rust inhibitor, preservative, antifungal agent, antioxidant, reduction inhibitor, and evaporation accelerator, as necessary. If metallic ink described above is used for the printing apparatus 100; when the ink is attached to a print medium, the ink exhibits conductivity or metallic gloss without a special operation such as baking.

Now, description will be provided for a display processing with the configuration described above, in which to check a printed image to be printed with the printing apparatus 100, the printed image is displayed as a preview on the display part 26 of the image processing apparatus 10. Here, the display processing will be described with reference to FIG.

Figure 3:
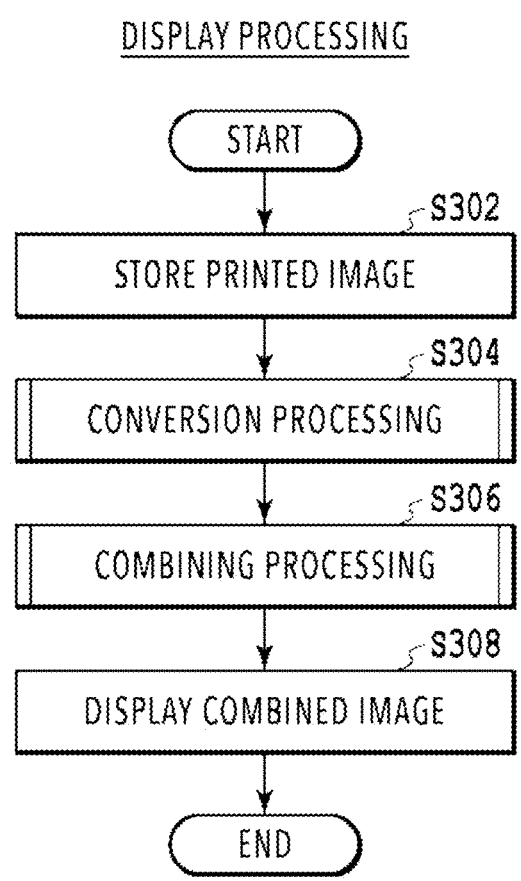
FIG. 3 is a flowchart illustrating the process contents of a display processing.

3. FIG. 3 is a flowchart illustrating detailed process contents of the display processing. In this display processing, first, printed image information (printed image) inputted by the user as print data (image data) is stored (step S302). In other words, at step S302, the printed image inputted by the user is stored in the RAM 108. The printed image is created by the user specifying a metallic area, to which metallic gloss is to be given, on the original image as a different plane or a different channel, using an image editing application or the like.

At step S302, as illustrated in FIG. 4, two kinds of print data, a color image data and a metallic gloss image data (color metallic image data), are stored as the printed image. The color image is an image having information on the color (color information) produced by printing the color ink. The metallic gloss image (color metallic image) is an image having information on metallic gloss (metallic gloss information) for expressing the color metallic area by applying the metallic ink and the color ink on top of each other. As described above, the metallic gloss image is an image created on a plane different from that of the color image. Here, description will be provided assuming that the print data has a golden plane for golden gloss as a metallic gloss image.

Note that the original image displayed on the image editing application may be an image without metallic gloss or may be an image processed to have metallic gloss at a specified area. Thus, for an original image without metallic gloss, the metallic gloss image is created by the user specifying an area to which the user wants to add metallic gloss when printing, and setting metallic gloss information on the metallic gloss to be added to the specified area. For an original image including metallic gloss information, the user specifies the area having the metallic gloss information. Here, the metallic gloss information is a functional quantity indicating the density (degree) of metallic gloss in the color metallic area, produced by applying color ink and metallic ink on top of each other. For example, for the golden plane, the quantity is expressed by a numerical value of 0% to 100% for every pixel.

It is assumed that the color image is an RGB image having three colors, that is, R (red), G (green), and B (blue), which is an image data outputted from an imaging apparatus, such as a common camera. Note that the color image is not limited to the RGB image but may be an image using C (cyan), M (magenta), and Y (yellow), which are the complementary colors of RGB. The color image may also be an image using four or more colors including K (black) or orange, which are spot colors. In other words, it means that the color image has color information associated with the coloring materials (such as pigments or dyes) of the color inks mounted on the printing apparatus 100. Note that those colors are arrayed on a pixel basis, or those colors may be arrayed on any specified unit basis, such as on a line basis, on a several-lines basis, or on an image basis.

As described earlier, the metallic gloss image is an image having metallic gloss information on metallic gloss produced by applying the color ink and the metallic ink mounted on the printing apparatus 100 on top of each other. Note that the metallic gloss information is acquired based on whether the area to be printed with metallic gloss has metallic gloss or not and the density of the metallic gloss, which are specified on the original image. Thus, the inputted print data includes an RGB image, which is a color image, and a metallic gloss image having the metallic function information.

Note that the metallic gloss information is not limited to one kind. For example, in addition to the golden plane indicating the golden color metallic area, the metallic gloss information may have another plane indicating a color metallic area of another color. In addition, metallic gloss information using golden ink as a spot color may be added, or multiple pieces of metallic gloss information may be used. Using the multiple pieces of metallic gloss information as described above reduces the number of transfers to the printing apparatus 100, reducing the overhead of communication between the image processing apparatus 10 and the printing apparatus 100, and thus increasing the transfer speed.

In some cases, the metallic gloss image is a binary image representing positions having metallic gloss and positions having no metallic gloss based on the metallic gloss information, and in other cases, the metallic gloss image is a multivalued image representing the tone of metallic gloss in addition to positions having metallic gloss and positions having no metallic gloss. Using the binary image reduces the amount of data in the image, and this in turns reduces the amount of data communicated between the image processing apparatus 10 and the printing apparatus 100. The multivalued image can express metallic gloss with tones by adjusting the amount of silver ink, providing a print result having more expressive power.

Next, a conversion processing is performed in which the metallic gloss information on the metallic gloss image is converted into silver display image data (hereinafter, simply referred to as "silver display image") for expressing the metallic gloss information using a display color that can be displayed on the display part 26 (step S304). The silver display image expressing the metallic gloss information with the display color is stored in the RAM 108. The display color in the silver display image is color information on the silver display image.

Figure 5A:
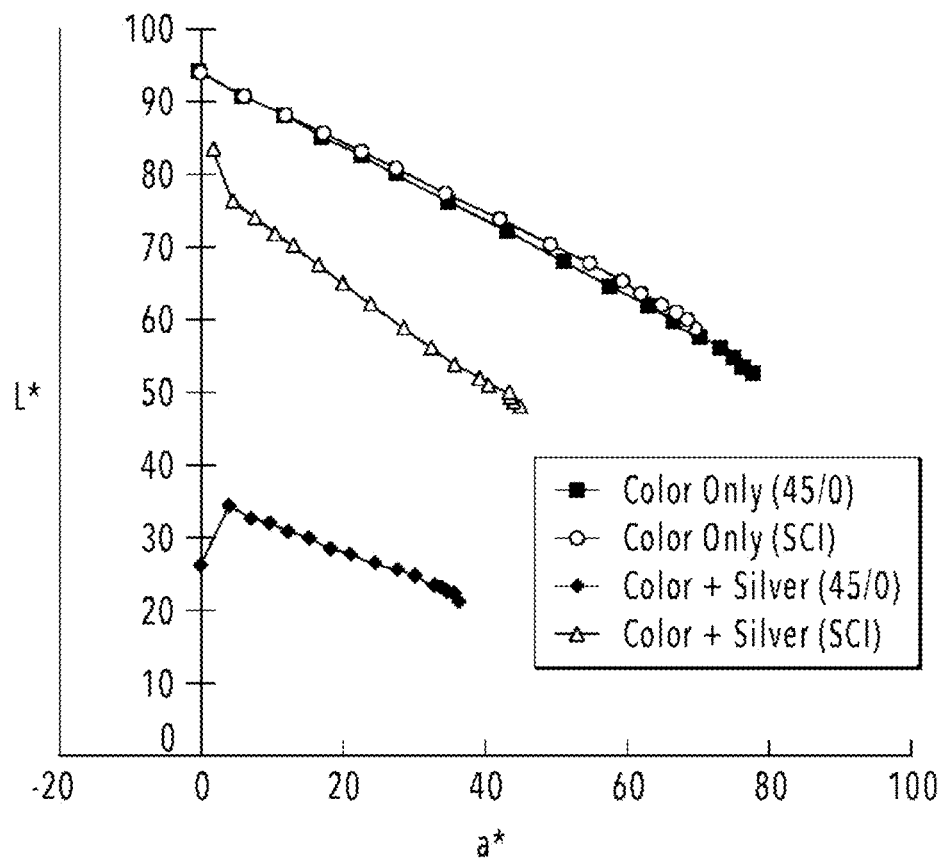
FIGS. 5A, 5B and 5C are explanatory diagrams for explaining metallic gloss.
Figure 5B:
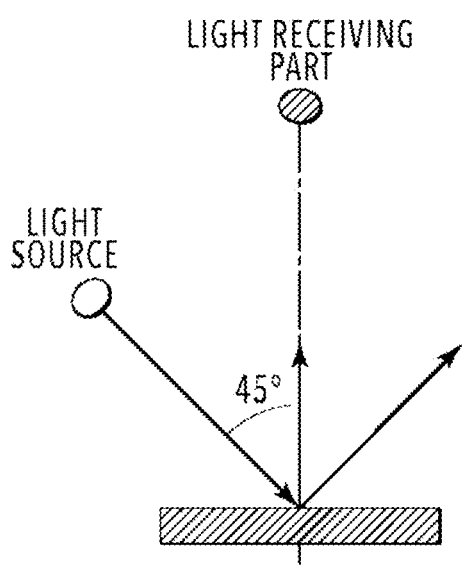
Figure 5C:
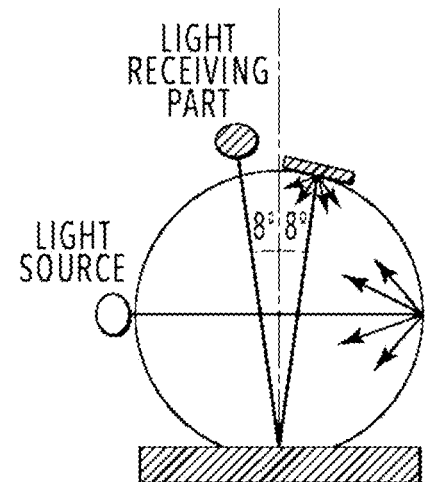

Here, description will be provided for metallic gloss. FIG. 5A illustrates measurement results of metallic gloss of a magenta tone patch chart (Color Only) and a patch chart in which a magenta tone patch was overlaid on a solid patch of silver ink (Color+Silver). The measurement environments were 45°/0° and SCI (specular component included) for each. FIG. 5B illustrates the environment for the 45°/0° measurement. In this environment, only diffuse reflected light is measured. FIG. 5C illustrates the environment for the SCI measurement. In this environment, light including both diffuse reflected light and specular reflected light is measured.

As illustrated in FIG. 5A, when an image to which only color ink was applied was measured, there were not much differences between the values measured in 45°/0° and the values colorimetrically measured in SCI. In comparison, when an image to which color ink and silver ink were applied on top of each other was colorimetrically measured, there were large differences between the colorimetrically measured values. The luminance values (L* values) measured in SCI are larger than those measured in 45°/0°. Thus, giving an image metallic gloss means that the image will have the luminance of the diffuse reflected light and that of the specular reflected light much different from each other. Specifically, the reflectance of the specular reflected light is higher than that of the diffuse reflected light. However, typical display apparatuses cannot display diffuse reflected light and specular reflected light at different luminances, and thus it is difficult to express metallic gloss in a preview display.

Figure 6:
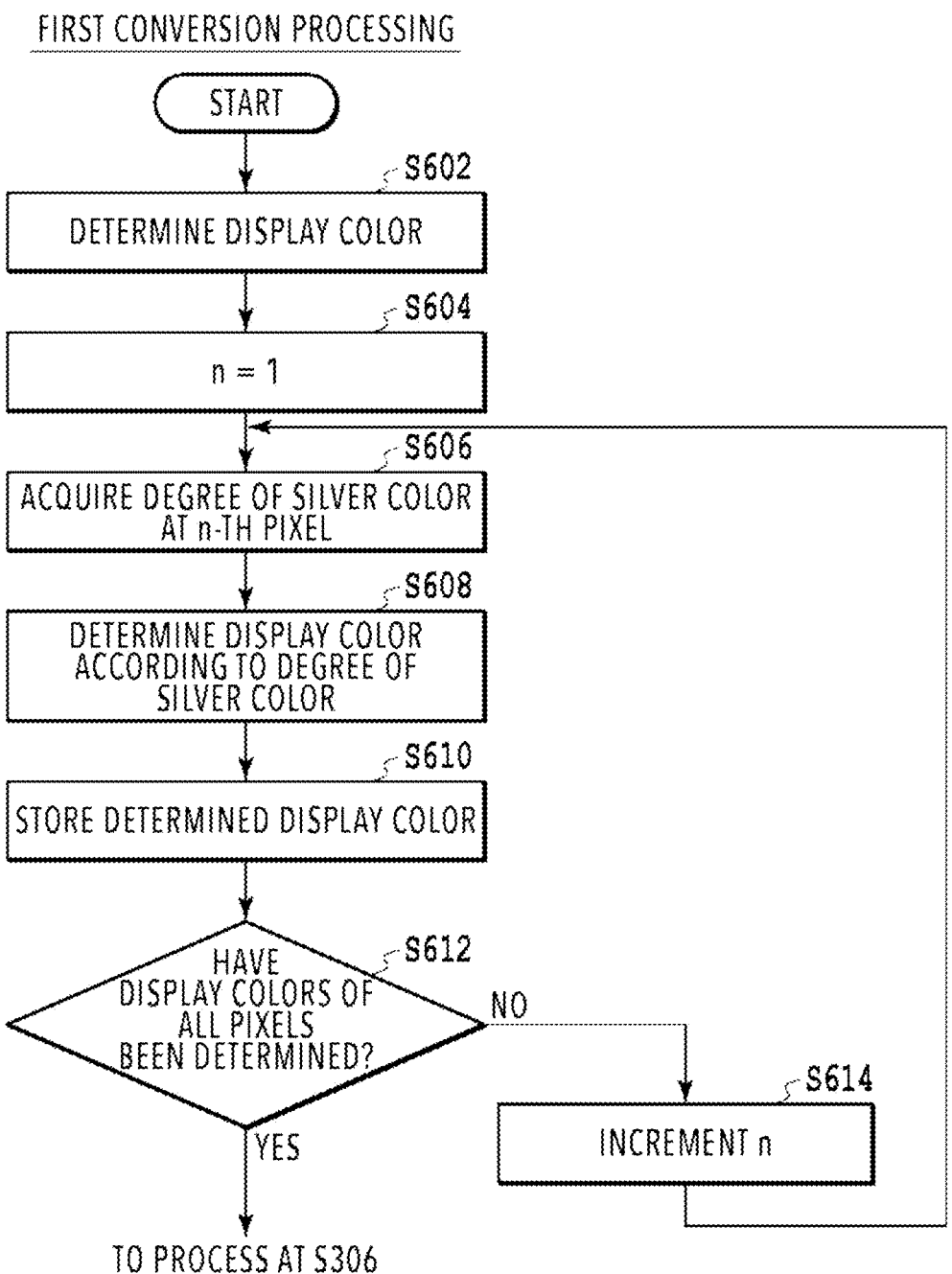
FIG. 6 is a flowchart illustrating the process contents of a first conversion processing.

In this regard, for a metallic gloss image, the conversion processing converts the metallic gloss information into a silver display image expressed by the color information (display color) that can be displayed on the display part 26 on a pixel-by-pixel basis at step S304. Note that in the following description, the conversion processing in this embodiment is referred to as the first conversion processing. Here, with reference to FIG. 6, the first conversion processing at step S304 will be described. FIG. 6 is a flowchart illustrating detailed process contents of the first conversion processing.

In the first conversion processing, first, the color of the display color for expressing the metallic gloss information is determined (step S602). As described above, it is difficult to display metallic gloss on a display apparatus. However, to improve the user's convenience, it is necessary to let the user know the position and density of metallic gloss in a printed image (printed matter). Accordingly, in this embodiment, the presence of metallic gloss is expressed, using a color that is displayable on the display part 26 of the image processing apparatus 10 and is different from the color inks forming the color metallic area having metallic gloss. This allows the color metallic area to be distinguishable from the areas having no metallic gloss in a preview display, making it easy for the user to know the position of the color metallic area. In addition, in the preview display, the degree of metallic gloss is expressed by the density (different tones) of the color indicating the presence of metallic gloss. This makes it easy for the user to know the variation of the degree of the metallic gloss in the color metallic area.

At step S602, a display color displayable on the display part 26 is selected as a color expressing the color metallic area, based on the color information on the area (the color metallic area) in the color image where the metallic gloss image exists. For example, in the case where the color of the color metallic area specified in the original image is gold, the gold color is produced by applying yellow ink and metallic ink on top of each other in the actual image printed on a print medium. Meanwhile, there is an expression method for decoration using metallic ink in which the degree of metallic gloss is varied. For example, in a case of using golden decoration expressed by using metallic ink and yellow ink, there is a case of using a gradation expression in which yellow gradually increases the degree of gloss from no gloss and changes into gold with gloss. In this case, if the color (yellow in this example) forming the color metallic area (gold in this example) is selected as the display color of the metallic gloss information to be used for the preview display, the user cannot distinguish the gold area and a yellow area from each other in the image displayed as a preview on the display apparatus. In particular, in the case of a gradation image in which the amount of applied metallic ink gradually increases while the amount of applied yellow ink remains the same, it is difficult for the user to recognize the change from yellow to gold in the preview display.

For this reason, in this embodiment, a color having a hue different from that of the color forming the color metallic area or a color having a chroma different from that of the color forming the color metallic area is selected as the display color in the preview display. At step S602, a hue different from the hue of the color forming the color metallic area in the metallic gloss image or a chroma different from the chroma of the color forming the color metallic area is selected as the hue or chroma of the display color. First, color separation is performed on the color information on the color metallic area in the metallic gloss image to know the color expressed using the color ink, excluding the metallic ink component. Then, a hue (or chroma) different from the hue (or chroma) of the color expressed by the color ink is selected as the hue (or chroma) of the display color to be used in the preview display. Specifically, if the color of the area where the metallic gloss image exists in the original image is gold, the color expressed by the color ink excluding the metallic ink component is yellow, and thus, a hue (or chroma) other than that of yellow is selected as the hue (or chroma) of the display color. A color the chroma of which is different from that of yellow is, for example, gray, the chroma of which is 0. Similarly, if the color of the color metallic area is red metallic, the color expressed by the color ink is red, and thus, a hue (or chroma) other than that of red is selected as the hue (or chroma) of the display color. A color the hue of which is different from that of red is, for example, cyan, which is the complementary color of red. With this process, even for the printed image having a gradation change in the degree of metallic gloss, such as the change from yellow with no metallic gloss to gold with metallic gloss, an area having metallic gloss is expressed using a hue (or chroma) other than that of yellow in the preview display. This process makes it possible to distinguish a gold area and a yellow area, having different degrees of gloss, from each other, even in the case of performing preview display using a display apparatus not capable of expressing metallic gloss. Note that the determination process for determining the hue (or chroma) of the display color as described above is executed by the control part 20.

Next, n=1 is set (step S604), and the degree of silver color in the n-th pixel to be processed is acquired (step S606). At step S604, the variable "n" indicating a pixel to be processed is set to 1. Then, serial numbers are given to the pixels in the metallic gloss image, and at step S606, the degree of silver color at the n-th pixel in the metallic gloss image is acquired based on the metallic gloss information. Here, the metallic gloss information indicates the density of metallic gloss of each pixel. For example, in the golden plane, the degree of gold color is expressed as 0% to 100% for each pixel. Then, the degree of silver color is acquired based on this metallic gloss information (the amount of gold color described above in this example). The degree of silver color is a value indicating the amount of the metallic ink to be applied, and is expressed as 0% to 100%.

Figures 7A, 7B:
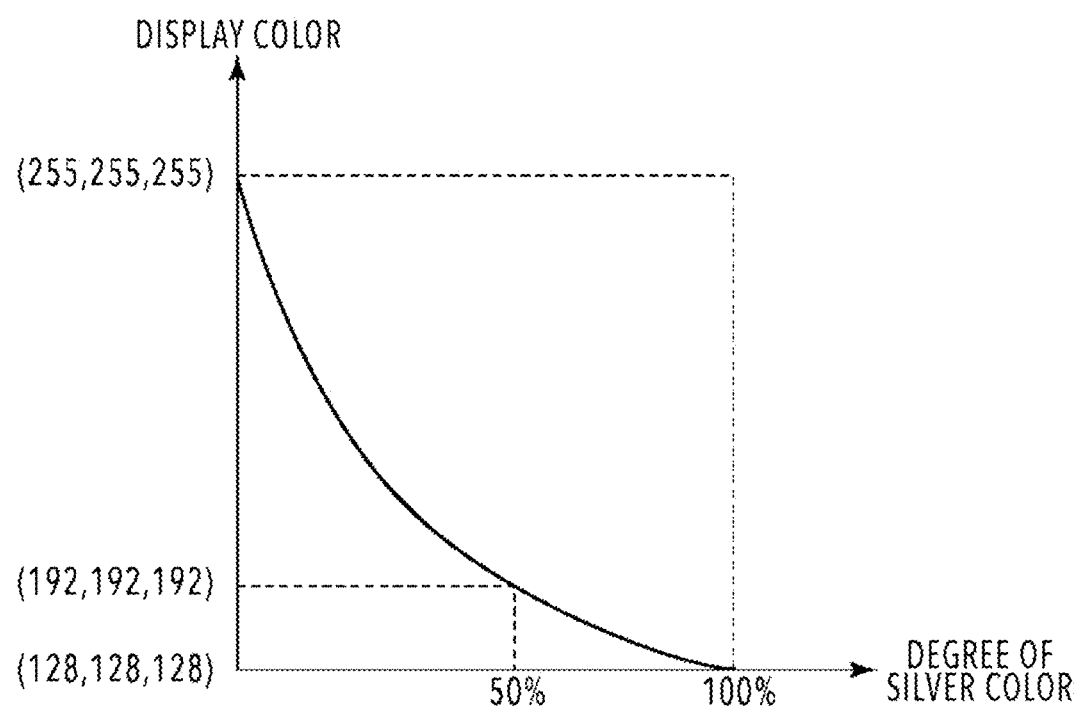
FIGS. 7A and 7B are explanatory diagrams illustrating the display color according to the amount of silver color.

After that, the display color in the preview display is determined according to the color selected at step S602 and the degree of silver color acquired at step S606 (step S608). FIG. 7A shows an example of a change table in which the display color is defined by the tone according to the degree of silver color, in the case where gray is selected as the color for expressing the color metallic area in the preview display. In this change table, the color selected at S602 is displayed at the highest density when the degree of silver color is 100%, and the tone of the display color changes as the degree of silver color decreases. When the degree of silver color is 0%, the color is displayed as white. Note that if the metallic gloss image is a binary image, the degree of silver color of pixels having metallic gloss is 100%, and thus, the display color is displayed as the color having the highest density in the hue selected at step S602.

The white expressed by the degree of silver color 0% means (R, G, B)=(255, 255, 255) in an image data having 8 bits for each of the RGB colors, which is the maximum value of the RGB signal value. In the change table, a relationship between tone of the display color and the degree of silver color may become linear. Note that in the change table, for example, the rate of change in tone of the display color from the degree of silver color 100% to the degree of silver color 0% may vary as illustrated in FIG. 7B. In the case where the change in metallic gloss is not proportional to the amount of applied metallic ink, use of a change table in which the rate of change varies improves the accuracy of tone expression. In addition, the display color is adapted to the display format of the color image. Since color images in this embodiment are RGB images, the display color is represented by RGB values to be adapted to the color image. As described above, a known technique such as an arithmetic operation using an approximate expression or a one-dimensional lookup table (LUT) can be used for the process at step S608. As for the display color in the change table, at least one of a brightness and a chroma of the hue may change according to the degree of metallic gloss. Hereby, difference in the degree of metallic gloss in the color metallic area is expressed by at least one of a difference in the brightness and a difference in the chroma in the same hue.

After the display color according to the degree of silver color is determined for the n-th pixel at step S608, the determined display color is stored in the RAM 108 being associated with the n-th pixel (step S610). Then, it is judged whether the display colors for all the pixels have been determined (step S612). In other words, at step S612, it is judged whether "n" has reached the last number of the serial numbers of the metallic gloss image. Here, if it is judged that the display colors of all the pixels have not been changed, in other words, "n" has not reached the last number, n is incremented (step S614) and the process returns to step S606. If it is judged at S612 that the display colors of all the pixels have been changed, in other words, "n" has reached the last number, this first conversion processing ends, and the process proceeds to step S306 described later.

As described above, in the first conversion processing, the hue or chroma of the display color displayable on the display part 26 is determined for the color metallic area where metallic gloss is to appear, the display color is determined according to the determined hue (or chroma) and the degree of silver color based on the metallic gloss information, and the metallic gloss image is converted to the silver display image. Thus, the silver display image includes the color information for displaying the color metallic area, where the metallic gloss is to appear, on the display part 26. Note that the first conversion processing described above is executed by the control part 20.

Figure 8:
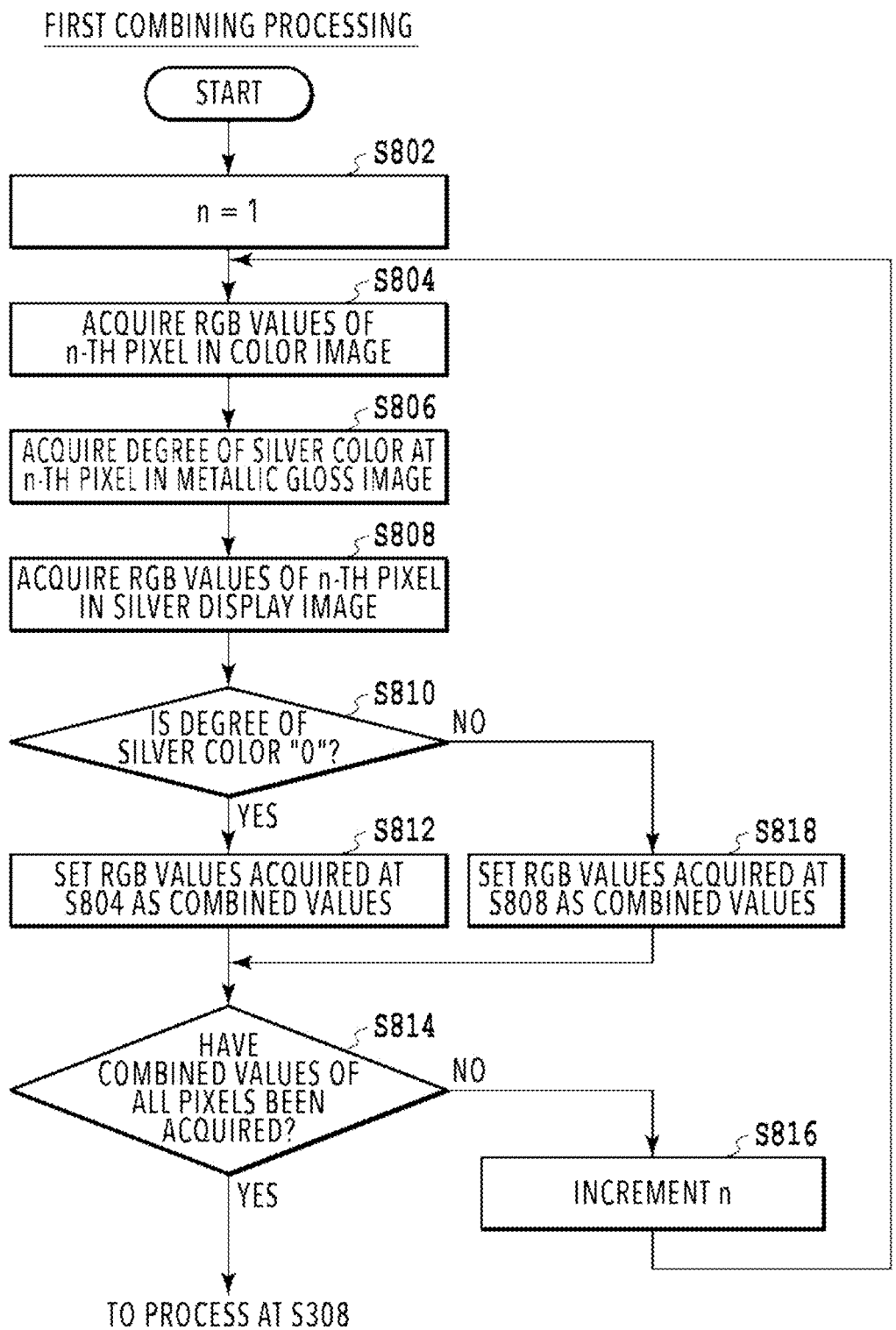
FIG. 8 is a flowchart illustrating the process contents of a first combining processing.

Turn to FIG. 3. When the conversion processing (first conversion processing) at step S304 for converting the metallic gloss image into the silver display image ends, the process proceeds to step S306, where a combining processing is performed for combining the color image and the silver display image acquired through the conversion processing. The combined image data which is image data generated through this combining processing (hereinafter, simply referred to as a "combined image") is stored in the RAM 108. Note that the combining processing in this embodiment is referred to as the first combining processing in the following description. Here, with reference to FIG. 8, the first combining processing at step S306 will be described. FIG. 8 is a flowchart illustrating detailed process contents of the first combining processing.

In the first combining processing, first, n=1 is set (step S802), and the color information on the n-th pixel to be processed in the color image, RGB values (R1, G1, B1) in this embodiment, is acquired (step S804). Next, the degree of silver color of the n-th pixel to be processed in the metallic gloss image, the amount of the metallic ink to be applied 0% to 100% in this embodiment, is acquired (step S806). The color information on the n-th pixel to be processed in the silver display image, RGB values (R2, G2, B2) in this embodiment, is acquired (step S808). Note that steps S804 to S808 may be executed in parallel, or the order of execution may be changed. The process for acquiring the degree of silver color and the RGB values of the pixels to be processed in each image stored in the RAM 108 as described above is executed by the control part 20.

After that, it is judged whether the degree of silver color is "0" (step S810). When it is judged at step S810 that the degree of silver color is "0", the RGB values (R1, G1, B1) of the color image acquired at step S804 are selected as combined values for the n-th pixel to be processed (step S812). Then, it is judged whether the combined values of all the pixels have been acquired (step S814). If it is judged that the combined values of all the pixels have not been acquired, n is incremented (step S816), and the process returns to step S804. If it is judged at step S814 that the combined values of all the pixels have been acquired, the first combining processing ends, and the process proceeds to step S308.

On the other hand, if it is judged at step S810 that the degree of silver color is not "0", the color of the n-th pixel to be processed is replaced with the RGB values (R2,G2,B2) of the silver display image acquired at step S808 as the combined values (step S818), and the process proceeds to step S814. Note that the combined values set as the replacement at steps S812 and S818 are stored in the RAM 108 being associated with the n-th pixel. The image of the pixels each associated with the combined values (the color information) is stored as a combined image (preview image data) in the RAM 108. Note that the process for acquiring the combined values based on the degree of silver color is executed by the control part 20. In other words, in this embodiment, the control part 20 functions as a generation part that converts the metallic gloss image into silver display image and generates a combined image based on the color image, the metallic gloss image and the silver display image.

Figure 9:
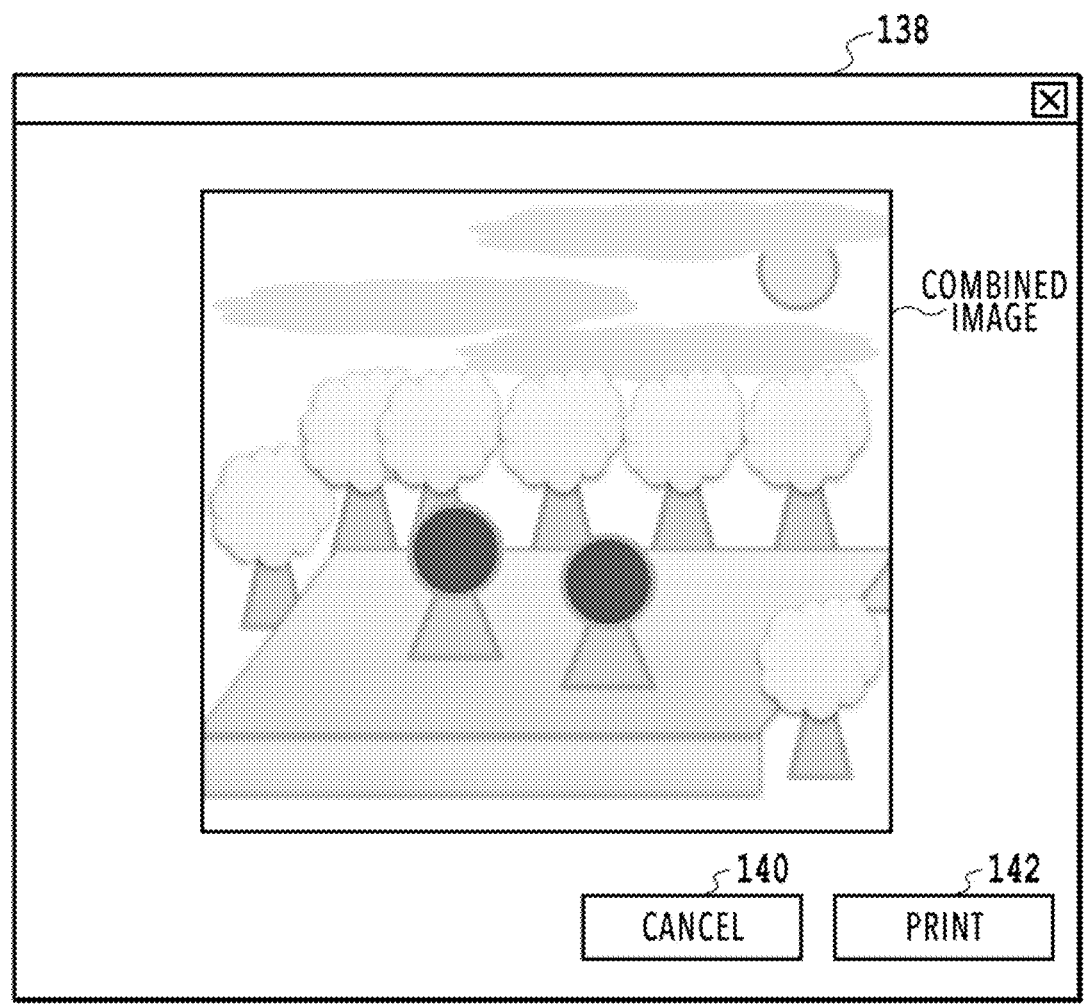
FIG. 9 is an explanatory diagram for explaining information displayed in a display area.

Turn to FIG. 3. After the first combining processing at step S306 ends, the process proceeds to step S308, and the combined image (preview image data) acquired through the first combining processing is displayed as a preview on the display part 26. Specifically, in the display part 26, the combined image as well as a cancel button 140 and a print button 142 is displayed in a display area 138 as illustrated in FIG. 9. The user checks the displayed combined image. If the user prints the image as-is, the user selects the print button 142 to start printing. On the other hand, if the user does not print the image, the user selects the cancel button 140. Note that the display part 26 may have only the combined image, and operation buttons or the like corresponding to the print button and the cancel button may be provided separately from the display part 26. Further, display as a preview of the combined image is executed by control part 20. In other words, in this embodiment, the control part 20 controls the display part 26 so that the combined image is displayed.

In the combined image displayed as a preview as above, the pixels corresponding to positions to which the metallic ink is to be applied are expressed by the display color (color information) of the color determined based on the metallic gloss information, and the other pixels are expressed according to the color information in the original color image. This makes it easy for the user to recognize the color metallic area to be printed with metallic gloss. In particular, this embodiment makes it easy to know the position of the color metallic area, to be printed with metallic gloss, in the printed image, and also makes it easy for the user to recognize the density of the metallic gloss in the color metallic area based on the multivalued metallic gloss image.

Note that the preview display of the combined image as described above is not limited to methods using the display part 26 of the image processing apparatus 10. For example, the printing apparatus 100 may have a display part on which a preview image is displayed, or the preview image may be displayed on both the display part 26 of the image processing apparatus 10 and the display part of the printing apparatus 100.

As has been described above, the image processing apparatus 10 determines the color of the display color displayable on the display part 26, based on the metallic gloss information. Here, the determined color is a color different from the color forming the color metallic area to which metallic gloss is to be applied (the area to be printed with metallic gloss, specified by the user). Then, for the determined color, a color according to the degree of silver color based on the metallic gloss information is selected as the display color to be used in the preview display, and the metallic gloss image is converted to the silver display image. Then, the color image and the silver display image are combined to generate the combined image in which the color information (display color) in the silver display image is associated with the pixels associated with the metallic gloss information in the metallic gloss image, and the color information in the color image is associated with the other pixels.

The configuration described above makes it possible for the image processing apparatus 10 to express the color metallic area where metallic gloss is to appear using a color different from the color forming the metallic gloss, and in addition to display as a preview the combined image having tone indicating the glossiness of the metallic gloss. The user can easily recognize, on the preview display, the position of the color metallic area where the metallic gloss is to appear and the glossiness of the metallic gloss when the image including the color metallic area is printed on a print medium, by checking the preview display on the display part 26. Consequently, compared to the case of doing the check work by actually printing the image on a print medium, this configuration reduces the number of print mediums and the amount of ink used for the check work, in turn reducing the burden on the user.

Second Embodiment

Figure 10:
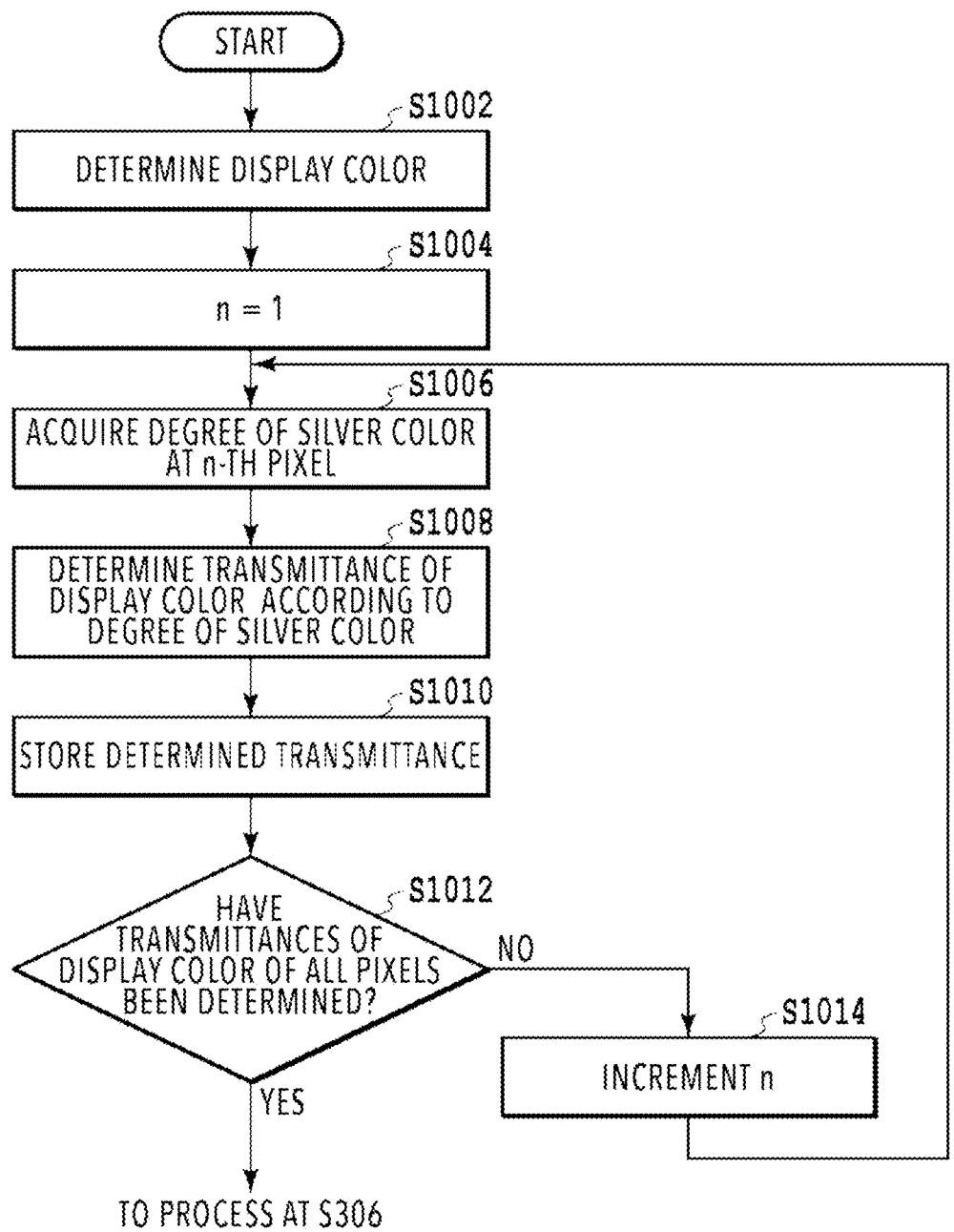
FIG. 10 is a flowchart illustrating the process contents of a second conversion processing.
Figures 11A, 11B, 11C:
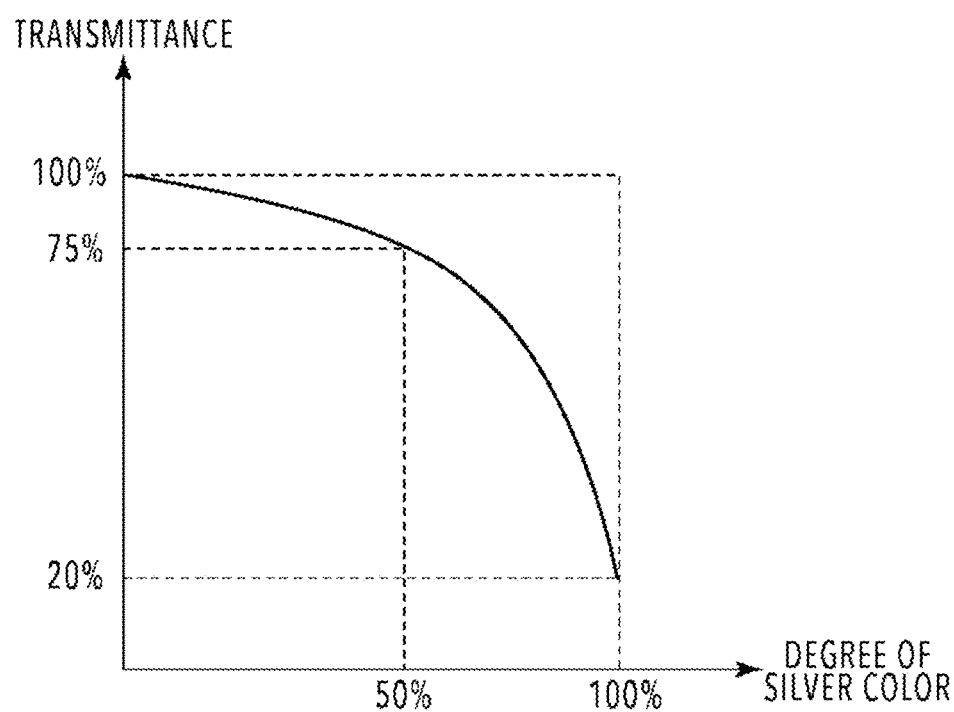
FIGS. 11A, 11B, and 11C are explanatory diagrams illustrating the transmittance of the display color according to the degree of silver color.
Figure 12:
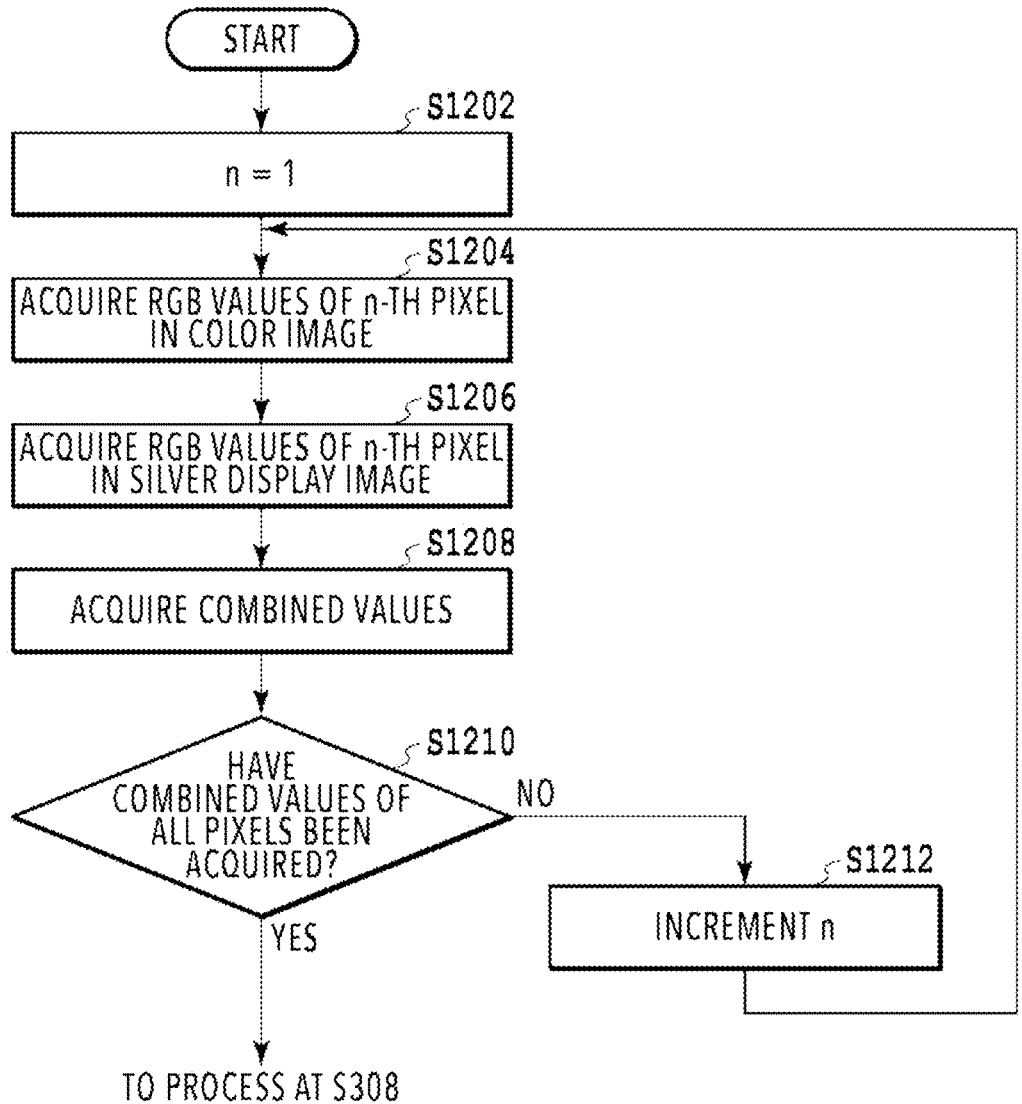
FIG. 12 is a flowchart illustrating the process contents of a second combining processing.

Next, with reference to FIGS. 10 to 12, description will be provided for a second embodiment of an image processing apparatus according to the present invention. Note that in the following description, the constituents that are the same as or equivalent to those in the image processing apparatus 10 described above are denoted by the same symbols, and description thereof is omitted as appropriate.

An image processing apparatus 200 according to the second embodiment is different from the above image processing apparatus 10 in the following points. Specifically, in the conversion processing at step S304 in the display processing, the metallic gloss image is converted into a silver display image in which the transmittance of the display color is changed according to the degree of silver color for each pixel. Also in the combining processing at step S306 in the display processing, the combined values according to the color information of the color image, the display color (the color information of the silver display image), and the transmittance are calculated to acquire the combined image. Hereinafter, description will be provided in detail for the conversion processing and the combining processing in the image processing apparatus 200. Note that the conversion processing and the combining processing in this embodiment are referred to as the second conversion processing and the second combining processing in the following description.

First, with reference to FIG. 10, the second conversion processing will be described. FIG. 10 is a flowchart illustrating detailed process routines of the second conversion processing. In the second conversion processing, first, the display color for expressing the metallic gloss information is determined (step S1002). Next, n=1 is set (step S1004), and the degree of silver color in the n-th pixel to be processed is acquired (step S1006). The process contents of steps S1002 to S1006 are the same as those of the above steps S602 to S606, and thus description of the steps is omitted.

After that, according to the degree of silver color acquired, the transmittance of the display color is determined (step S1008). In other words, at step S1008, the transmittance is determined based on a change table indicating the transmittance of the display color according to the degree of silver color, for example, as illustrated in FIG. 11A. In this change table, the display color is constant and the same as the display color determined at step S1002. The transmittance is 100% when the degree of silver color is 0%, decreases linearly as the degree of silver color increases, and is 0% when the degree of silver color is 100%. Note that in the change table, for example, the transmittance may be a value larger than 0% when the degree of silver color is 100% as illustrated in FIG. 11B. In addition, as illustrated in FIG. 11C, the rate of change from transmittance 0% to transmittance 100% may vary.

After the transmittance of the display color is determined according to the degree of silver color for the n-th pixel as described above, the determined transmittance is stored in the RAM 108 being associated with the n-th pixel (step S1010). After that, it is judged whether the transmittances of the display color of all the pixels have been determined (step S1012). If it is judged that the determinations have not been made for all the pixels, n is incremented (step S1014), and the process returns to step S1006. If it is judged at step S1012 that the determinations have been made for all the pixels, this second conversion processing ends, and the process proceeds to step S306.

Note that in the second conversion processing, the display color and the transmittance of the display color of each pixel are determined based on the metallic gloss information. Thus, in the silver display image stored in the RAM 108 through the second conversion processing, information on the display color (color information) and the transmittance of the display color is associated with each pixel.

As described above, in the second conversion processing, the displaying ratio of the determined display color is changed according to the degree of silver color based on the metallic gloss information, and the metallic gloss image is converted into the silver display image based on this change result. The second conversion processing described above is executed by the control part 20.

Next, with reference to FIG. 12, the second combining processing will be described. FIG. 12 is a flowchart illustrating detailed process routines of the second combining processing. After the conversion processing (second conversion processing) at step S304 for converting the metallic gloss image into the silver display image ends, the process proceeds to step S306, and the combining processing (second combining processing) is performed for combining the color image and the silver display image acquired through the conversion processing. The combined image is stored in the RAM 108.

In the second combining processing, first, n=1 is set (step S1202), and the color information on the n-th pixel to be processed in the color image, in other words, RGB values (R1, G1, B1) in this embodiment, is acquired (step S1204). Also, the color information on the n-th pixel to be processed in the silver display image, in other words, RGB values (R2, G2, B2) in this embodiment, and the transmittance are acquired (step S1206). Note that steps S1204 to S1206 may be executed in parallel, or the order of execution may be changed. The acquisition of the information from the pixels to be processed described above is executed by the control part 20, in the same way as in the first combining processing.

After that, based on the acquired color information and transmittance, the combined values of the n-th pixel to be processed are acquired (step S1208). In other words, at step S1208, when α represents the transmittance and transmittance α satisfies 0≤α≤100, the combined values (Rout, Gout, Bout) are calculated by the following formulae.

$$Rout=\{\alpha \times R1+(100-\alpha)\times R2\}/100$$

$$Gout=\{\alpha \times G1+(100-\alpha)\times G2\}/100$$

$$Bout=\{\alpha \times B1+(100-\alpha)\times B2\}/100$$

The combined values acquired as above are stored in the RAM 108 being associated with the n-th pixel, and the image of the pixels each associated with the combined values (the color information) is stored in the RAM 108 as the combined image. Note that the above process for acquiring the combined values is executed by the control part 20 in the same way as in the first combining processing. In other words, in this embodiment, the control part 20 functions as a generation part that converts the metallic gloss image into a silver display image, and generates a combined image based on the color image and the silver display image.

After the combined values of the n-th pixel to be processed are acquired, it is judged whether the combined values of all the pixels have been acquired (step S1210). If it is judged that the combined values of all the pixels have not been acquired, n is incremented (step S1212), and the process returns to step S1204. If it is judged at step S1210 that the combined values of all the pixels have been acquired, the second combining processing ends, and the process proceeds to step S308.

When the combined image generated by the process at step S308 is displayed on the display part 26, the color information in the silver display image is more emphasized where the metallic gloss is higher, and the color information in the color image is more emphasized where the metallic gloss is lower. This allows the user to recognize an image under the color metallic area where the metallic gloss is to appear and recognize the degree of gloss in the color metallic area more clearly in the image actually printed.

As has been described above, the image processing apparatus 200 selects a display color displayable on the display part 26 based on the metallic gloss information. Here, a color different from the color forming the color metallic area where the metallic gloss is to be applied is selected as the display color. Then, the transmittance of the display color is changed according to the degree of silver color based on the metallic gloss information when the metallic gloss image is converted into the silver display image. Then the color information on each pixel in the combined image for displaying a preview on the display part 26 is acquired, based on the display color (the color information of the silver display image), the transmittance, and the color information on the color image. In other words, the displaying ratio of the display color is changed by changing the transmittance of the display color when the combined image is acquired, and the combined values are acquired based on the displaying ratio. Hereby, in the combined image which was generated, a difference in the degree of metallic gloss in the color metallic area is expressed by a difference in the transmittance of the display color.

The configuration described above of the image processing apparatus 200 makes it possible to recognize an image under the color metallic area where metallic gloss is to appear on the image printed on a print medium and to check the degree of the gloss while recognizing the position of the metallic gloss in the print result more clearly, in addition to the operational effects of the image processing apparatus 10 described above.

Third Embodiment

Figure 13:
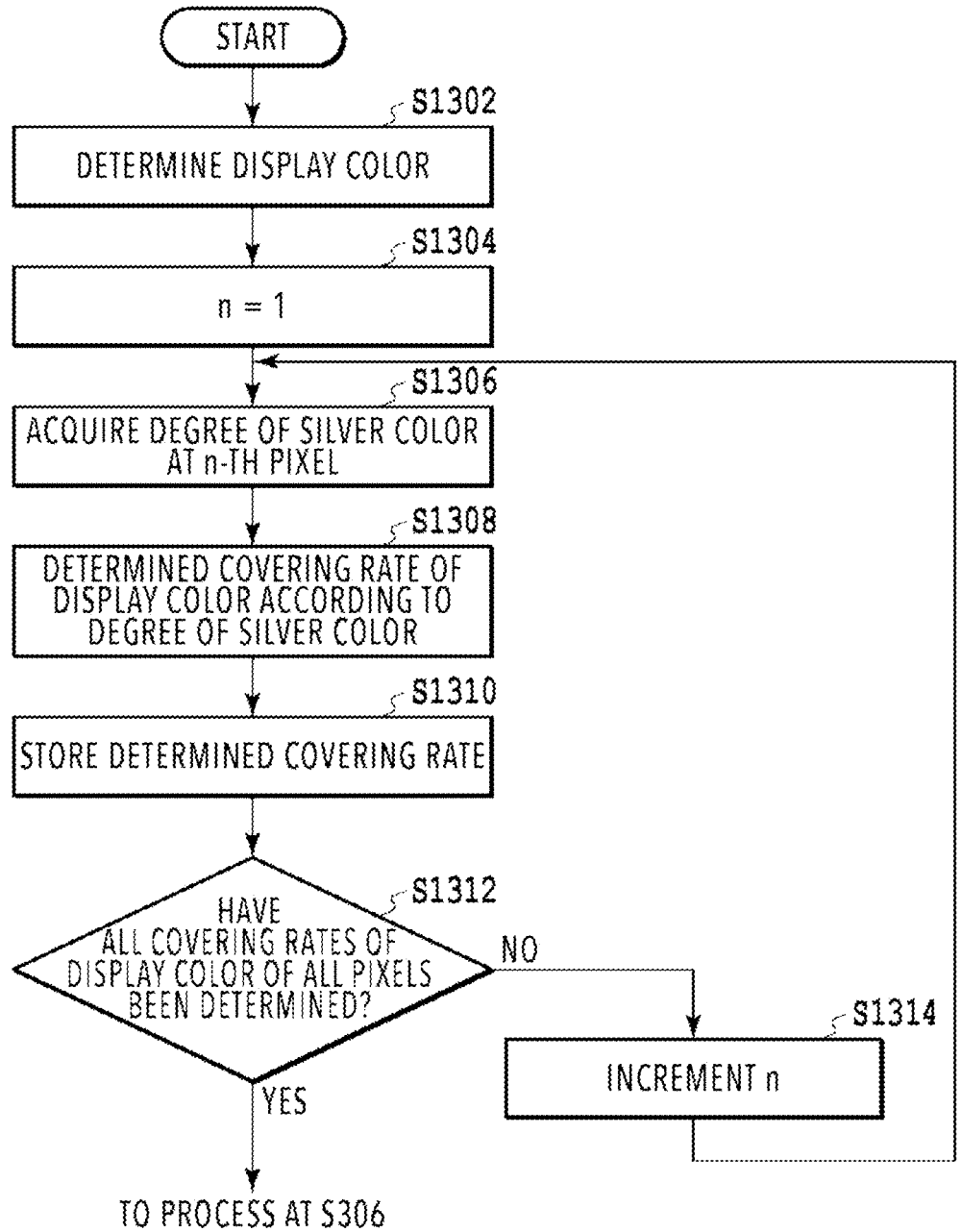
FIG. 13 is a flowchart illustrating the process contents of a third conversion processing.
Figures 14A, 14B, 14C:
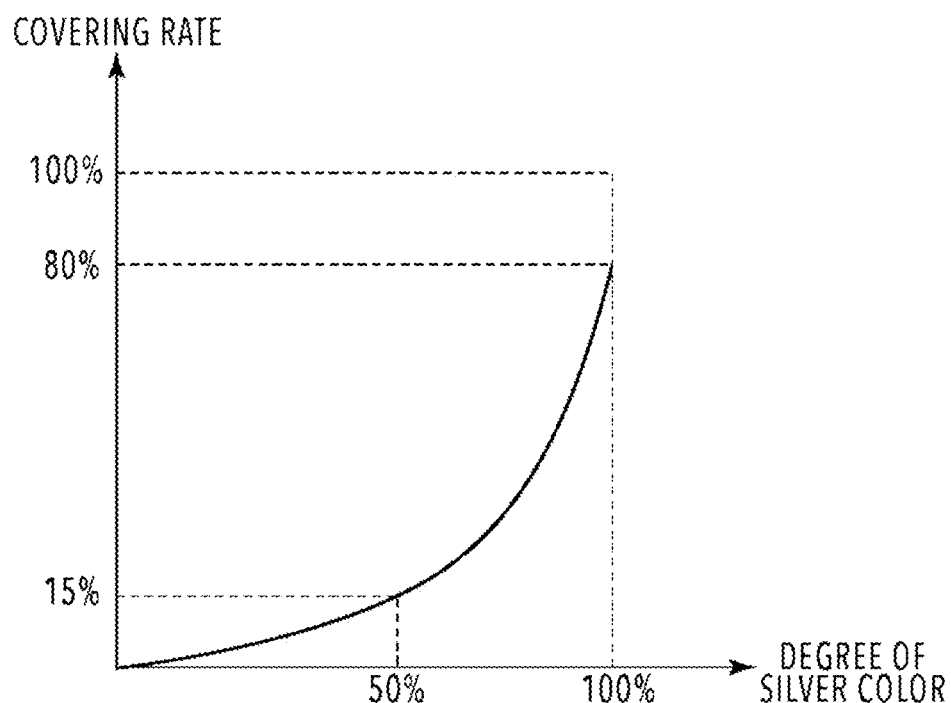
FIGS. 14A, 14B, and 14C are explanatory diagrams illustrating the covering rate of the display color according to the degree of silver color.
Figure 15:
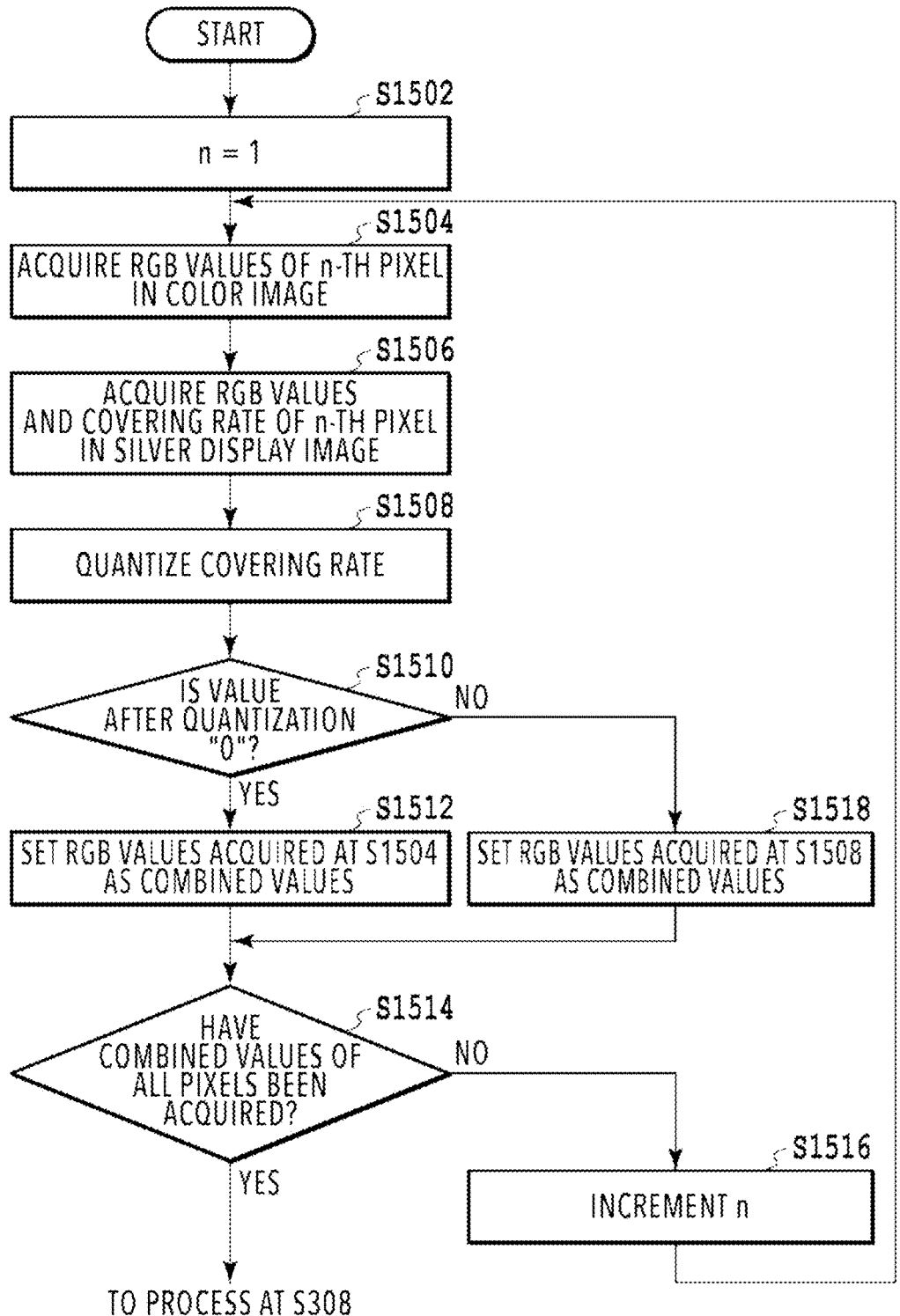
FIG. 15 is a flowchart illustrating the process contents of a third combining processing.

Next, with reference to FIGS. 13 to 15, description will be provided for a third embodiment of an image processing apparatus according to the present invention. Note that in the following description, the constituents that are the same as or equivalent to those in the image processing apparatus 10 described above are denoted by the same symbols, and description thereof is omitted as appropriate.

An image processing apparatus 300 according to the third embodiment is different from the above image processing apparatus 10 in the following points. Specifically, in the conversion processing at step S304 in the display processing, the metallic gloss image is converted into a silver display image in which the covering rate of the display color is changed according to the degree of silver color for each pixel. Also in the combining processing at step S306 in the display processing, the combined values are determined based on the covering rate to acquire the combined image. Hereinafter, description will be provided in detail for the conversion processing and the combining processing in the image processing apparatus 300. Note that the conversion processing and the combining processing in this embodiment are referred to as the third conversion processing and the third combining processing in the following description.

First, with reference to FIG. 13, the third conversion processing will be described. FIG. 13 is a flowchart illustrating detailed process routines of the third conversion processing. In the third conversion processing, first, the display color for expressing the metallic gloss information is determined (step 1302). Next, n=1 is set (step S1304), and the degree of silver color in the n-th pixel to be processed is acquired (step S1306). The process contents of steps S1302 to S1306 are the same as those of the above steps S602 to S606, and thus description of the steps is omitted.

After that, according to the degree of silver color acquired, the covering rate of the display color is determined (step S1308). In other words, at step S1308, the covering rate is determined based on a change table indicating the covering rate per unit area of the display color according to the degree of silver color, for example, as illustrated in FIG. 14A. In this change table, the display color is constant and the same as the display color determined at step S1302. The covering rate is 0% when the degree of silver color is 0%, increases linearly as the degree of silver color increases, and is 100% when the degree of silver color is 100%. Note that in the change table, for example, the covering rate may be a value smaller than 100% when the degree of silver color is 100% as illustrated in FIG. 14B. With this setting, even in the case where the degree of silver color is nearly 100%, such as when a circuit image is printed with metallic ink, it is possible to display the circuit image with the RGB image.

In addition, as illustrated in FIG. 14C, the rate of change from covering rate 0% to 100% may vary.

After the covering rate of the display color is determined according to the degree of silver color for the n-th pixel as described above, the determined covering rate is stored in the RAM 108 being associated with the n-th pixel (step S1310). After that, it is judged whether the covering rates of the display color of all the pixels have been determined (step S1312). If it is judged that the determinations have not been made for all the pixels, n is incremented (step S1314), and the process returns to step S1306. If it is judged at step S1312 that the determinations have been made for all the pixels, this third conversion processing ends, and the process proceeds to step S306.

Note that in the third conversion processing, the display color and the covering rate of the display color of each pixel are determined based on the metallic gloss information. Thus, in the silver display image stored in the RAM 108 through the third conversion processing, information on the display color (the color information) and the covering rate of the display color is associated with each pixel.

As described above, in the third conversion processing, the displaying ratio of the determined display color is changed according to the degree of silver color based on the metallic gloss information, and the metallic gloss image is converted into the silver display image based on this change result. This third conversion processing is executed by the control part 20.

Next, with reference to FIG. 15, the third combining processing will be described. FIG. 15 is a flowchart illustrating detailed process routines of the third combining processing. After the conversion processing (third conversion processing) at step S304 for converting the metallic gloss image into the silver display image ends, the process proceeds to step S306, and the combining processing (third combining processing) is performed for combining the color image and the silver display image acquired through the conversion processing. The combined image acquired is stored in the RAM 108.

In the third the combining processing, first, n =1 is set (step S1502), and the color information on the n-th pixel to be processed in the color image, in other words, RGB values (R1, G1, B1) in this embodiment, is acquired (step S1504). Also, the color information on the n-th pixel to be processed in the silver display image, in other words, RGB values (R2, G2, B2) in this embodiment, and the covering rate are acquired (step S1506). Note that steps S1504 to S1506 may be executed in parallel, or the order of execution may be changed. The acquisition of the information from the pixels to be processed described above is executed by the control part 20, in the same way as in the first combining processing.

Next, the acquired covering rate is quantized (step S1508). The quantization of the covering rate is performed using a known technique described above. After that, it is judged whether the value after the quantization is "0" (step S1510). When it is judged at step S1510 that the value after the quantization is "0", the RGB values (R1, G1, B1) of the color image acquired at step S1504 are determined as combined values for the n-th pixel to be processed (step S1512). Then, it is judged whether the combined values of all the pixels have been acquired (step S1514). If it is judged that the combined values of all the pixels have not been acquired, n is incremented (step S1516), and the process returns to step S1504. If it is judged at step S1514 that the combined values of all the pixels have been acquired, the third combining processing ends, and the process proceeds to step S308.

On the other hand, if it is judged at step S1510 that the value after the quantization is not "0", the RGB values (R2,G2,B2) of the silver display image acquired at step S1506 are set as the combined values for the n-th pixel to be processed (step S1518), and the process proceeds to step S1514. Note that the combined values acquired at steps S1512 and S1518 are stored in the RAM 108 being associated with the n-th pixel to be processed. The image of the pixels each associated with the combined values (the color information) is stored as a combined image (preview image data) in the RAM 108. The above process for acquiring the combined values is executed by the control part 20 in the same way as in the first combining processing. In other words, in this embodiment, the control part 20 functions as a generation part that converts the metallic gloss image into a silver display image and generates a combined image based on the color image and the silver display image.

In the process at step S308, the area where the metallic gloss is to appear is expressed by the display color based on the metallic gloss information in the combined image displayed on the display part 26. For this reason, even when the color metallic area where the metallic gloss is to appear is small, the user can check the area with high accuracy.

As has been described above, the image processing apparatus 300 selects a display color displayable on the display part 26 based on the metallic gloss information. Here, the display color is a color different from the color forming the color metallic area where the metallic gloss is applied. Then, the covering rate of the display color is determined according to the degree of silver color based on the metallic gloss information when the metallic gloss image is converted into the silver display image. Then the color information on the pixels in the combined image for displaying it on the display part 26 is acquired, based on the display color, the covering rate, and the color information on the color image. Specifically, the covering rate for each pixel on the combined image is quantized. If the value is 0, the RGB values of the color image are set as the color information, and if the value is not 0, the RGB values of the silver display image are set as the color information. In other words, the displaying ratio of the display color is changed by changing the covering rate of the display color when the combined image is acquired, and the combined values are acquired based on the displaying ratio. Hereby, in the combined image which was generated, difference in the degree of metallic gloss in the color metallic area is expressed by difference in the covering rate of the display color.

As described above, the image processing apparatus 300 provides the same operational effects as the above image processing apparatus 10. In addition, the image processing apparatus 300 allows the user to recognize the area where the metallic gloss is to appear with high accuracy even when the degree of silver color is small.

Other Embodiments

Note that the above embodiments may be modified as described in the following (1) to (7).

(1) In the above embodiments, at step S602 in the conversion processing, the selected color is different from the color forming the color metallic area where the metallic gloss image exists. However, the present invention is not limited to this approach. The selected color as a display color displayable on the display part 26 may be an approximate color similar to a metallic color widely recognized. For example, the color may be (R, G, B)=(192, 192, 192) for silver color, or (R, G, B)=(255, 215, 0) for gold color. With this setting, even when multiple users check the preview display, it is less likely that the multiple users have different recognition.

In addition, by analyzing the color image of print data, a color that is not used in this color image may be selected as the display color, out of colors different from the color forming the color metallic area. In this case, the position of the metallic gloss in the print result is expressed by a unique color. This allows the user to recognize information such as the position of the area where the metallic gloss is to appear, more easily.

To select a color that is not used in the color image as the display color, a range within the color space may be set using the colors used in the color image as references. For example, the range is set as colors having a color difference (delta E) of "10" or more with respect to the colors used in the color image in the LAB color space. Alternatively, a threshold may be set, for example, such that the sum of the differences from the signal values such as the RGB values is "30" or more. In this case, use of the color space of the print data reduces the time taken for the color space conversion calculation. Further, by weighting each signal value, these weights may be multiplied when the sum of the signal values are calculated. This improves both the determination speed and the determination accuracy.

Alternatively, the user may set the display color. If the display color set by the user is a color difficult to recognize when displayed, for example, as in the case where the display color set by the user is close to the color forming the color metallic area, change of the color may be suggested to the user by letting the user know the reason, or the color may automatically be changed to another color. With this configuration, even if the user sets the display color, it is possible to recognize, in the preview display with high accuracy, information such as the position of the area where metallic gloss is to appear in the printed image.

(2) In the above first embodiment, for the pixel to be processed in the first combining processing, the degree of silver color is acquired from the metallic gloss image, together with the RGB values from the color image and silver display image, and then the combined values are acquired by judging whether the degree of silver color is "0". However, the present invention is not limited to this approach. First, the degree of silver color may be acquired from the metallic gloss image, and if the degree of silver color is "0", the RGB values may be acquired from the color image and these RGB values may be set as the combined values. If the degree of silver color is not "0", the RGB values may be acquired from the silver display image, and these RGB values may be set as the combined values.

(3) In the above second embodiment, the transmittance of the display color is changed with the display color kept constant in the second conversion processing. However, the present invention is not limited to this approach. The transmittance may be kept constant, and the display color may be changed according to the degree of silver color as in the first embodiment.

(4) In the above embodiments, the combining processing is performed for combining the color image and the silver display image, and the combined image acquired through the combining processing is displayed on the display part 26. However, the present invention is not limited to this approach. The color image and an image in which the display color is changed according to the degree of silver color in the area where metallic gloss is to appear may be displayed alternately. Specifically, the color image and the combined image are displayed alternately in step S308. This allows the user to recognize the difference between the color image and the combined image more easily, and thus the user can recognize the area where metallic gloss is to appear with higher accuracy.

Alternatively, eliminating the combining processing at step S306, the color image and the silver display image may be displayed alternately in the process at step S308. In this case, since there is a time when only the area where metallic gloss is to appear is displayed; even if the area is small, it is less likely that the user overlooks the area. In this case, for the above second and third embodiments, an image including only the area where metallic gloss is to appear is generated from the combined image, and this image and the color image are displayed alternately.

Further, displaying the color image and the silver display image (or the combined image) alternately a predetermined number of times in a continuous manner allows the user to recognize the area where metallic gloss is to appear, as if the area remains on the color image as an after-image effect. This makes it possible to recognize the area where metallic gloss is to appear more clearly.

(5) The image processing apparatus 10, 200, or 300 includes the display part 26 for displaying the processed image as a preview. In this case, the image processing apparatus 10, 200, or 300 function as an image processing apparatus for processing printed images so that the printed image can be displayed on the display part 26 and also functions as a display apparatus including the display part 26 for displaying a combined image acquired through this processing. However, the image processing apparatus according to the present invention may have a display part 26 separately from the image processing apparatus 10, 200, or 300, or the printing apparatus 100. In this configuration, the image processing apparatus 10, 200, or 300 only functions as an image processing apparatus for processing printed images so that the printed image can be displayed on the display part 26. In this case, the processes at steps S302, S304, and S306 in the display processing are executed by the image processing apparatus, and the process at step S308 is executed by the display part. Note that, for example, in the case where the display part 26 is separate, the control part 20 in the image processing apparatus may judge what format the display part 26 uses for the output, and process images into the format according to the judgement result.

(6) The image processing apparatus according to the present invention may have a configuration capable of selectively executing the display processing in each embodiment described above. In addition, although in the above embodiments, the transmittance and the covering rate in the conversion tables change linearly (in other words, continuously), these may change stepwise.

(7) Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2017-224736, filed Nov. 22, 2017, and No. 2018-203993, filed Oct. 30, 2018, which are hereby incorporated by reference wherein in their entirety.

What is claimed is:

1. An image processing apparatus comprising:
one or more processors; and
one or more computer-readable media coupled to the one or more processors, the one or more computer-readable media storing instructions that, when executed by the one or more processors, cause the image processing apparatus to perform operations comprising:
(A) a generation step of generating preview image data for displaying, on a display apparatus, a preview image corresponding to a print image including a color metallic area to be printed on a print medium, the color metallic area to be printed using metallic material containing metal particles and color material, based on input image; and
(B) a control step of controlling the display apparatus to cause the display apparatus to display the preview image, based on the preview image data generated in the generation step,
wherein, in the control step, a display color of an area corresponding to the color metallic area to be printed in a predetermined metallic color on the print medium, in the preview image, is different from the deteremined metallic color.

2. The image processing apparatus according to claim 1, wherein a reflectance of an image, to which the metallic material is applied on the print medium, is higher on specular reflected light than on diffuse reflected light.

3. The image processing apparatus according to claim 1, wherein the input image data is data for printing using a plurality of colors of materials.

4. The image processing apparatus according to claim 1, wherein a content of the metal particles in the metallic material is (a) 0.1% by mass or more and (b) 30.0% by mass or less,
wherein the metal particles are made of any one of gold, silver, and copper, and
wherein a diameter of the metal particles is (a) 1 nm or more and (b) 200 nm or less.

5. The image processing apparatus according to claim 1, wherein the display color is an achromatic color.

6. The image processing apparatus according to claim 1, wherein a difference in a degree of metallic gloss to be expressed in the color metallic area is expressed by at least one of a difference in a brightness and a difference in a chroma in a same hue.

7. The image processing apparatus according to claim 1, wherein the display color is a color that is not used in the print image.

8. The image processing apparatus according to claim 1, wherein the display color is a color specified by a user.

9. The image processing apparatus according to claim 1, wherein the display color is different from a first color corresponding to the predetermined metallic color.

10. The image processing apparatus according to claim 9, wherein the first color is expressed only by the color material in a case when an image of the predetermined metallic color is printed.

11. The image processing apparatus according to claim 9, wherein, in a case when the predetermined metallic color is gold, the first color is yellow.

12. The image processing apparatus according to claim 9, wherein, in a case when the predetermined metallic color is red metallic, the first color is red.

13. The image processing apparatus according to claim 9, wherein a hue of the display color is different from a hue of the first color.

14. The image processing apparatus according to claim 9, wherein a chroma of the display color is different from a chroma of the first color.

15. The image processing apparatus according to claim 1, wherein the input image data comprises a color component corresponding to the color material and a metallic component corresponding to the metallic material.

16. The image processing apparatus according to claim 15, wherein the color component is data expressed by red, green, and blue (RGB) values.

17. The image processing apparatus according to claim 15, wherein, in the generation step, the preview image data is generated using the color component without the metallic component.

18. The image processing apparatus according to claim 15, wherein, in the generation step, (a) an amount of the metallic material to be applied to print the color metallic area is acquired based on the metallic component, and (b) the display color is set based on the acquired amount of the metallic material.

19. The image processing apparatus according to claim 18, wherein a relationship between a tone of the display color and the acquired amount of the metallic material is linear.

20. The image processing apparatus according to claim 15, wherein a difference in a degree of the metallic gloss to be expressed based on the metallic component is expressed in the preview image data by a difference in a transmittance or a difference in a covering rate.

21. The image processing apparatus according to claim 1, wherein the color material is a color ink and the metallic material is a metallic ink.

22. The image processing apparatus according to claim 21, wherein the color metallic area is printed in a manner that, after the metallic ink is applied to the print medium, the color ink is applied.

23. The image processing apparatus according to claim 1, wherein the print image further includes a color area to be printed using the color material without the metallic material.

24. The image processing apparatus according to claim 23, wherein the display color is a color having a color difference delta E of 10 or more with respect to colors used in the print image.

25. An image processing method comprising:
(A) a generation step of generating preview image data for displaying, on a display apparatus, a preview image corresponding to a print image including a color metallic area to be printed on a print medium, the color metallic area to be printed using metallic material containing metal particles and color material, based on input image data; and
(B) a control step of controlling the display apparatus to cause the display apparatus to display the preview image, based on the preview image data generated in the generation step, wherein, in the control step, a display color of an area corresponding to the color metallic area to be printed in a predetermined metallic color on the print medium, in the preview image, is different from the predetermined metallic color.

* * * * *